(12) United States Patent
Griessbaum et al.

(10) Patent No.: US 8,843,329 B2
(45) Date of Patent: Sep. 23, 2014

(54) MEASURING FILLING LEVEL BY MEANS OF EVALUATING AN ECHO CURVE

(75) Inventors: Karl Griessbaum, Muehlenbach (DE); Josef Fehrenbach, Haslach (DE); Thomas Deck, Wolfach (DE); Winfried Rauer, Fischerbach (DE); Martin Gaiser, Alpirsbach (DE)

(73) Assignee: VEGA Grieshaber KG, Wolfach (DE)

( * ) Notice: Subject to any disclaimer, the term of this patent is extended or adjusted under 35 U.S.C. 154(b) by 305 days.

(21) Appl. No.: 12/712,641

(22) Filed: Feb. 25, 2010

(65) Prior Publication Data

US 2010/0223019 A1    Sep. 2, 2010

Related U.S. Application Data

(60) Provisional application No. 61/156,688, filed on Mar. 2, 2009.

(30) Foreign Application Priority Data

Mar. 2, 2009    (EP) .................................. 09 154 141

(51) Int. Cl.
*G01R 23/00* (2006.01)
*G01F 23/28* (2006.01)
*G01F 23/296* (2006.01)
*G01F 23/284* (2006.01)

(52) U.S. Cl.
CPC .......... *G01F 23/284* (2013.01); *G01F 23/2962* (2013.01)
USPC .............................................. 702/55; 702/75

(58) Field of Classification Search
CPC .............................................. G01F 23/00–23/30
USPC ........................ 702/39, 40, 47, 48, 52, 55, 75
See application file for complete search history.

(56) References Cited

U.S. PATENT DOCUMENTS

| 4,521,778 A | 6/1985 | Knepper |
| 5,207,101 A | 5/1993 | Haynes |
| 5,457,990 A | 10/1995 | Oswald et al. |

(Continued)

FOREIGN PATENT DOCUMENTS

| CN | 1 471 625 | 1/2004 |
| CN | 1 766 673 | 5/2006 |

(Continued)

OTHER PUBLICATIONS

Zhao, Master Degree Thesis of Taiyuan University of Technology, Nov. 15, 2006, Zhao Meifeng, 100 pgs.

*Primary Examiner* — Sujoy Kundu
*Assistant Examiner* — Ricky Ngon
(74) *Attorney, Agent, or Firm* — Fay Kaplun & Marcin, LLP

(57) ABSTRACT

A method for filling level measuring includes generating an echo curve. The echo curve is analyzed by at least one analysis method selected from analysis methods including analyzing the echo curve by at least two parallel tasks or is analyzed by comparing the echo curve with a spurious-echo curve at the IF-level.

17 Claims, 15 Drawing Sheets

(56) References Cited

U.S. PATENT DOCUMENTS

| | | |
|---|---|---|
| 6,810,342 B1 | 10/2004 | Gulden et al. |
| 6,954,717 B2 | 10/2005 | Boldt et al. |
| 6,972,712 B1 | 12/2005 | Karlsson |
| 7,730,760 B2* | 6/2010 | Schroth et al. ............... 73/1.73 |
| 7,747,397 B2 | 6/2010 | Welle et al. |
| 7,826,309 B2* | 11/2010 | Spanke et al. ............... 367/99 |
| 7,966,141 B2 | 6/2011 | Spanke et al. |
| 2005/0094148 A1 | 5/2005 | Neumann |
| 2006/0052954 A1* | 3/2006 | Welle et al. ............... 702/55 |
| 2007/0094664 A1* | 4/2007 | So et al. ............... 718/103 |
| 2007/0186678 A1 | 8/2007 | Griessbaum et al. |
| 2008/0143583 A1* | 6/2008 | Welle et al. ............... 342/124 |
| 2011/0035576 A1* | 2/2011 | Grittke et al. ............... 713/100 |

FOREIGN PATENT DOCUMENTS

| | | |
|---|---|---|
| DE | 31 07 444 | 10/1982 |
| DE | 10 2004 055 551 | 2/1995 |
| DE | 43 27 333 | 2/1995 |
| DE | 44 07 369 | 9/1995 |
| DE | 199 25 216 | 1/2001 |
| DE | 10 2006 006 572 | 8/2007 |
| EP | 1 039 273 | 9/2000 |
| EP | 1 225 455 | 7/2002 |
| EP | 1 562 051 | 8/2005 |
| GB | 2 094 091 | 9/1982 |

\* cited by examiner

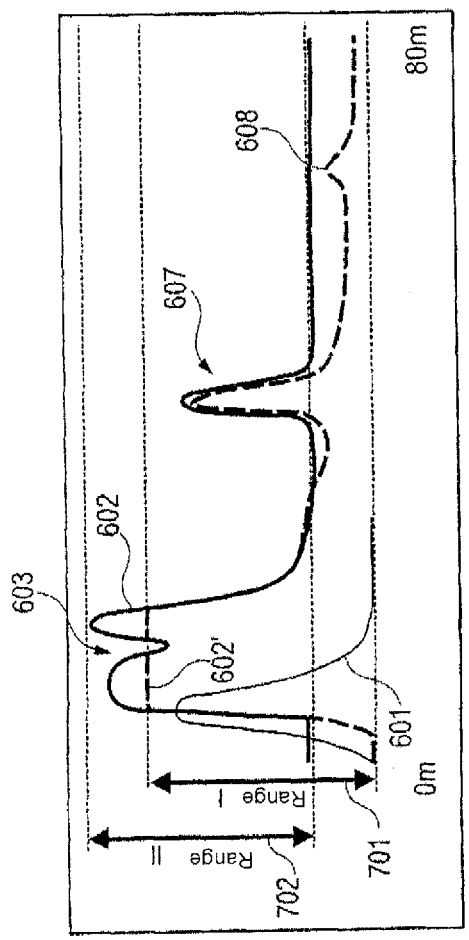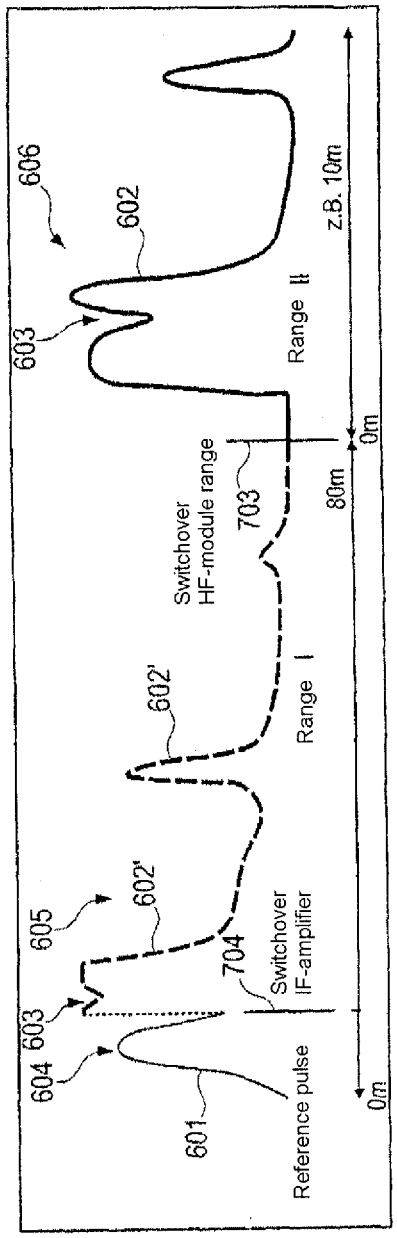

MEASURING FILLING LEVEL BY MEANS OF EVALUATING AN ECHO CURVE

REFERENCE TO RELATED APPLICATIONS

This application claims the benefit of the filing date of European Patent Application No. EP 09 154 141.7 filed 2 Mar. 2009, the disclosure of which is hereby incorporated herein by reference and of U.S. Provisional Patent Application No. 61/156,688 filed 2 Mar. 2009 the disclosure of which is hereby incorporated by reference.

FIELD OF THE INVENTION

The present invention relates to the technical field of measuring technology. In particular, the present invention relates to measuring filling levels, to a method for filling level measuring, to a program element, to a measuring device and to the use of the measuring device for collision monitoring.

TECHNOLOGICAL BACKGROUND

In filling level measuring by means of transit time methods, an echo profile, an echo function or an echo curve is generated cyclically in order to, from this, in an evaluation algorithm that is also referred to as "useful-echo identification", identify the "correct" echo that emanates from a feed material surface in order to subsequently, in a further algorithm that can be referred to as "echo measuring", measure the transit time of this echo. Transit time sensors that are used for such filling level measuring may process the tasks of echo evaluation and echo measuring completely and in mutual alternation, as a result of which a rigid serial sequence may arise. Evaluating an echo may involve the determination of the reflection from the feed material surface by means of an echo profile of the entire measuring span, and measuring may involve determining a distance value and/or a filling level value of the echo profile of the filling material reflection.

From DE 10 2006 006 572 A1 it may be known that by sampling relatively few values of an IF-signal an envelope and also phase angles of the IF-signal are to be computed in each case from only two sampling points.

DE 199 25 216 C1 may disclose reference measuring of unwanted signals and subtracting a component of a frequency spectrum that is caused by interference frequencies from a sampled measuring signal to a differential signal.

Furthermore, in DE 44 07 369, determining a correction value from a fraction of a carrier frequency, which fraction has been determined by the phase angle, may be described.

U.S. Pat. No. 5,457,990 may disclose a method for registering a liquid level in a tank by means of an analysis window.

Furthermore, U.S. Pat. No. 5,207,101 may describe the periodic supply of energy to a transducer in order to transmit energy pulses that are reflected by the surface of a material to be measured.

In EP 1 562 051 A2 a pulse measuring process may be described which during a first phase generates an echo profile, and which interrupts the first phase in order to charge an energy storage device at least once.

DE 43 27 333 A1 may describe a method for measuring the filling level of a liquid in a container according to the radar principle, wherein unwanted signals that occur in a measuring spectrum and that are independent of the filling level height of the liquid are corrected by means of the measured intensity of a first unwanted signal.

EP 1 225 455 A2 may describe the subtraction of undesired radio frequency interference.

Furthermore, U.S. Pat. No. 6,972,712 B1 may disclose the storage of a pulse shape in a ROM during pre-installation calibration.

DE 31 074 44 may describe a method for a high-resolution pulse radar.

SUMMARY OF THE INVENTION

It may be desirable to have a more effective method for filling level measuring.

According to exemplary embodiments of the present invention, a method for filling level measuring, a program element, a measuring device and the use of the measuring device for collision monitoring are provided.

According to a further exemplary embodiment of the present invention, the method for filling level measuring may comprise generating an echo curve. Furthermore, in the method the generated echo curve may be analysed by means of at least one analysis method, which analysis method may be selected from a group of analysis methods, which group comprises analysing the echo curve by means of at least two parallel tasks and analysing the echo curve by comparison with a spurious-echo curve (i.e. a false echo curve which does not represent the filling level) at the intermediate frequency (IF)-level.

For example, the spurious-echo curve may be a standard (i.e. reference) echo curve. In other words, the spurious-echo curve may be an echo curve that has been determined and stored with the exclusion of feed material in the feed material container. Thus, the spurious-echo curve may contain all the interference with the exception of the interference influence of the feed material. The standard echo curve or spurious-echo curve may generally be a stored echo curve with which a recorded echo curve can be compared. This stored echo curve may be used as a reference.

In this arrangement one task may be a task that is to be carried out by a device or apparatus, in particular by a control device, within a limited period of time or a time interval. This analysis may take place in the time domain or in the frequency domain, in other words on and/or along a time axis or a frequency axis. Furthermore, analysing at IF (intermediate frequency)-level may involve multiplying the echo curve by a sampling signal.

According to a further exemplary embodiment of the present invention, a program element may be provided which may comprise a software code which when executed on a processor involves generating an echo curve and analysing the echo curve. For analysis of the echo curve, an analysis method or an analysis process may be used that is selected from the group of analysis methods comprising analysing by means of at least two parallel tasks and analysing the echo curve by comparing a standard echo curve at the IF-level.

According to a further exemplary embodiment of the present invention, a measuring device may be provided that comprises an echo-curve generating device and an analysis device. The echo-curve generating device may be designed for generating an echo curve, and the analysis device may be designed for analysing the echo curve by means of an analysis method. In this arrangement the analysis method may be an analysis method that may be selected from the group of analysis methods that may comprise analysis by means of at least two parallel tasks and analysis by comparing an echo curve with a standard echo curve at the IF-level.

According to yet another exemplary embodiment of the present invention, the method according to the invention and/or the measuring device according to the invention may be provided for use in collision monitoring. In this arrangement, the use may comprise the provision of the method and/or the measuring device as well as carrying out the method for filling level measuring with the result of collision monitoring.

Carrying out measuring tasks may comprise generating and evaluating an echo, and after the echo has been generated, measuring the echo. When measuring the echo, the distance to a reference echo may be determined. This determined distance may be able to be converted to a filling level. For determining the filling level a serial process or a sequential process may be used. During sequential processing a task may wait for some other task to be fully completed. This may mean that measuring the echo can essentially only be carried out after evaluation of the echo, or that the task of measuring the echo may wait for evaluation of the echo to take place.

In order to be able, during filling level measuring, to determine an essentially current filling level, i.e. in real time, in a container, this rigid sequence may periodically be repeated. Thus, within the cycle duration of an individual measuring process, each time an evaluation and a measuring process may take place. Thus the cycle duration or the measuring rate may be determined by the duration for evaluation and the duration for measuring, and for this reason, in the case of little available power with corresponding sensors that operate according to this serial sequence, either the measuring rate may be reduced or the quality of the echo evaluation or of the echo profile evaluation may be low.

Echo evaluation or echo profile evaluation may involve determining the reflections from a feed material surface by means of an echo profile within the entire measuring span. The term "measuring span" may refer to the distance range that is of interest, measured from an antenna. The size of the measuring span may be determined by the range within which the filling level and thus the echoes are suspected, and therefore this range is to be investigated. For example, the measuring span may involve a range from 0 m to 40 m. In one example, measuring the echo may involve determining a distance value by means of the echo profile of the feed material reflection. The distance value can be converted to a filling level value.

By dividing the processes of evaluating and measuring, for example, into two or several tasks, the rigid, serial sequence may be broken up. Evaluating and measuring may thus involve two tasks whose processing in time can be carried out largely or entirely independently of each other.

Evaluating may involve determining an echo position. Measuring may involve determining a distance between the echo position and a reference pulse or reference echo.

In this context the term "independent" may mean that while results of the individual tasks or processes are taken into account by the respective other task, the duration of execution of the respective task can, however, be carried out essentially independently of the other task. In other words, as long as a task may have information at its disposal that makes it possible for the task to carry out the task, this task will actually carry out the task. A task thus need not wait for processing of the other task to be completed before it becomes active.

The two tasks can, for example, be processed by the same processor or microcontroller, but they can be largely independent of each other as far as their processing in time is concerned. In this arrangement a so-called time slice or multitasking may be made available to the respective task, by the processor or the executing device. A corresponding control algorithm or scheduling algorithm may ensure distribution of the computing time of the executing device. The duration of allocation to the processor may not describe an interdependence of the tasks because this allocation may take place independently of a result or of completion of a task. In other words, the computing time allowed in each case to a task may be correspondingly allocated to the task. When allocating computing time to the task, prioritisation may be used, wherein prioritisation may be guided by means of the respectively necessary measuring rate or execution rate of the respective task.

Evaluating, or the evaluation of, the echo curve may involve slow but sure investigation of the entire measuring range. Selection of the so-called "correct" echo may be the result of this investigation. The "correct" echo may be the sought echo or useful echo whose position in time in a reflection diagram may essentially correspond to the local position of a feed material surface. In order to carry out the selection or evaluation of the correct echo, a high energy requirement may exist because the entire echo range may have to be evaluated. The entire echo range may comprise a multitude of individual reflections or echoes. Measuring the found correct echo may be able to be carried out quickly and in an energy-saving manner.

Thus a task that may be busy evaluating may have a high demand for computing time and thus have high energy consumption but may be able to do without high repeat speed. Evaluation may result in an approximate or rough position of an echo. While the position may not yet be precisely determined, the probability of it being the sought useful echo should be correspondingly high. The evaluation task is thus able to convey the approximate position of an echo or approximate coordinates of the echo to the measuring task. The measuring task may then investigate the conveyed echo by means of echo measuring algorithms and from the approximate coordinates may determine the precise position of the echo.

This method may be able to be used both for determining the position of the reference echo and for determining the position of the useful echo. In this arrangement the position of the useful echo and/or the position of the reference echo can be determined by means of further parallelised tasks.

Since the position of the echo may essentially change slowly, the speed requirement of an evaluation task may be modest. However, the precise position or essentially precise position of the echo may quickly change, for example, as a result of vibration on the feed material surface, and for this reason the measuring rate of the measuring algorithm may have to satisfy very considerable requirements. Evaluating and measuring may involve different energy requirements because the long computing time of evaluating may be associated with a high energy requirement, while the short computing time of measuring may be associated with a low energy requirement.

For example, in the time during which an entire echo curve may be evaluated a multitude of current values may be provided by the measuring task. This fast provision of measuring values may also make it possible to register short-term time fluctuations of an echo.

This means that with parallel processing quasi at the same time both generating an entire echo profile and generating echo profiles within a section of the echo profile or within a window may be provided for. In other words, the approximate coordinates of the position of an echo may be described by means of a window, wherein the useful echo with considerable probability may be situated within this window. The window may indicate a range or section in which the echo curve should be investigated more closely. In particular, the coordinates may indicate the position of the echo or of an echo range. By means of a further echo profile evaluation, which may, however, be limited to the range in the interior of the window, the echo profile can be investigated for useful echoes and/or for reference echoes; in other words, the echo curve can be investigated in a limited temporal range and/or spatial range.

Division into at least two tasks may make it possible for the periodicity by means of which tasks are processed to be variably set. Thus, points in time of triggering the individual tasks can be set individually and variably. It may thus be possible for a predeterminable multitude of measuring processes to be able to take place during a predetermined number of evaluations. For example, the multitude of evaluations may be less than the multitude of measuring processes. In this arrangement, organisation of the at least two tasks may be serial. In the example of serial organisation a one-off evaluation may be carried out, and subsequently or during evaluation, completed evaluation may be carried out x times, i.e. any number of times, after which this process may periodically be repeated. The number x of measuring processes may be predeterminable.

In another example, quasi parallel processing of the tasks may take place, which may mean that the two tasks may be interleaved in such a way that the evaluation task may time and again be interrupted by the measuring task. For example, in the time interval it takes for the result of an evaluation to be present, a result for measuring an echo may be carried out repeatedly. Interleaved carrying out of the two tasks may make multitasking operation possible, in other words the same processor may periodically carry out the individual tasks. The term "independent tasks" may refer to tasks having a context of their own, for example a status of their own or an instruction counter of their own. In this way the same processor can treat the individual tasks in the manner of tasks that are processed in parallel.

In another exemplary embodiment of the present invention each task may have its own processor allocated, and consequently a high degree of independence may be achieved. The individual tasks may essentially only depend on each other in that they may take into account the results of the individual tasks.

It is thus also possible to achieve a cyclic sequence for generating an echo profile, wherein the rigidity of serial processing may be overridden. This may mean that cyclically an echo profile may be generated from which in an evaluation algorithm the "correct" echo may be identified by the feed material surface and thereafter this echo may be measured with regard to its transit time.

In relation to the measuring algorithm or the measuring task, essentially only part of the echo profile may be generated, while for the evaluation algorithm the entire echo profile is generated. The evaluation algorithm may take into account all the echoes that are situated within the predeterminable measuring span. The evaluation algorithm may consequently take into account all the echoes that are situated between a minimum distance and a maximum distance from the antenna. The evaluation algorithm may take into account all the echoes because the filling level echo can be at any desired position within the range of the measuring span.

In relation to the echo measuring task, only the range around the useful echo, which range is predetermined by the useful-echo identification, i.e. by the evaluation algorithm, and the range of the reference echo may be of interest, because the mutual distance between the ranges may result in the distance of the useful echo and thus in a measured value for the filling level.

By providing different tasks the measuring rate may be able to be increased. The term "measuring rate" may refer to the speed with which a measured value can be renewed at the output of a sensor. The measuring rate can determine the time resolution of a measuring device.

In an example in which a small process container may be used, quick changes in the filling level, or greatly fluctuating filling levels may occur. It may thus be necessary to increase the measuring rate. Furthermore, sensors which operate, for example, according to the transit time principle may be used in object monitoring, for example in collision detection. Thus even considerable demands for a high measuring rate can be met. Furthermore, it may be possible to save energy because the energy-consuming evaluation process or the evaluation task may be carried out less frequently. The relationship between the measuring rate and the performance requirement may be optimised, wherein at the same time the reliability of selecting the correct echo may be improved.

If the evaluation process provides a measuring window or a measuring range, the measurement process may then essentially concentrate only on this section of an echo profile. Consequently the available performance of a measuring sensor or the available resources may be able to be used more efficiently for determining a filling level. Evaluation and, echo measuring may involve generating an echo curve or an echo profile. For generating an echo profile, the sensor may transmit a transmission signal in the direction of a feed material surface, from whose transit time to the feed material and back to the sensor the distance between the feed material and the sensor and thus the container filling level can be determined. The transmission signal may be an HF-pulse (high-frequency pulse). In order to generate a transmission signal or a transmission pulse, high power may be necessary, and thus a reduction in the number or duration of this power-intensive generation of echo curves may result in a reduction in the power consumption or energy consumption of the measuring sensor.

The term "echo curve" or "echo profile" may generally refer to a signal that represents an amplitude curve of echoes or reflections with respect to the distance. In an analogue echo curve the time axis may correspond to the distance axis so that the amplitude curve over time reflects the echoes of the measuring path. In this arrangement the amplitude curve can be visible directly or indirectly by way of the modulation of a carrier signal. The amplitude curve, which is presented directly as the envelope of a modulation of a carrier signal, may be referred to as an "envelope". The amplitude curve, which is presented indirectly by way of the modulation of a carrier signal, may be referred to as a "carrier frequency curve" or "intermediate frequency (IF) curve". If the envelope is present directly as a signal, then this signal is the envelope. In the case of an IF-curve the amplitude curve of the envelope is not present as a separate signal, but instead it can only be read from the curve of the amplitude of the carrier signal.

The term "digital echo curve" may refer to the time-discrete and amplitude-discrete counterpart to the analogue echo curve. Accordingly, the digital echo curve may be a group of digital values whose sequence may characterise the amplitude curve of reflections over a defined distance range. For example, the digital echo curve may comprise the digital amplitude values of an envelope and/or of an IF-curve.

Analysis of an echo curve, of an echo profile or of an echo may prevent interference. When measuring echoes, a time-extended IF-curve or envelope may be generated from a pulse train, for example by periodic sampling or mixing with a sampling signal. The position of the envelope of the useful echo in relation to the position of the envelope of a reference echo may determine a transit time that may be decisive to the filling level. However, as a result of interference influences within a container the position of a useful echo may not be precisely determinable.

Moreover, the envelope may reflect absolute values. The envelope may, for example, be based on a higher-frequency curve or IF-curve.

For example, an envelope of an interference function can be subtracted from an envelope of an echo function in order to mask interference. However, since both the envelope of the echo function and the envelope of the interference curve may have been formed by value formation of a higher-frequency IF-curve, despite the desired subtraction an addition of the amounts may occur.

Physically, the envelope may be an operand which traces or envelops the shape of a higher-frequency pulse train. The pulse train may comprise a multitude of sinusoidal oscillations which during superposition with other pulse trains can add up or be eliminated. When comparing two pulse trains merely on the envelope level, which pulse trains propagate independently, pulsation of the common amplitude of the superimposed pulse trains may result because of alternating adding up and elimination. A relative shift in position or shift in time of the reflectors may be the reason for pulsation. The reflectors may cause the reflections. Pulsation may, however, make it difficult to precisely determine the position of an echo. The term "reflector" may refer to a component or a surface that reflects an electromagnetic wave, some other wave, for example a sound wave, or elementary particles.

For example, in order to be able to take into account interference such as projections or flanges that are present in a fixed manner in a feed material container, a standard profile or interference profile of the respective container may be prepared. The interference profile may be prepared in an unfilled state of the container and may make echoes visible that arise as a result of interference positions such as projections, lead-ins or ladders within the container.

In one example this spurious-echo profile, which is essentially present also during the measuring process, may be deductible from a determined echo profile, and consequently only the useful echo should form. As a result of the superposition effects of the higher-frequency pulses or pulse trains which form the basis of the envelope, the already-mentioned undesirable pulsing may, however, result.

Subtracting the spurious-echo profile from, or comparing it with, an actually determined echo profile at the IF-level may also make it possible to provide an image of an echo that may have been corrected by removal of the spurious echo. The term "IF-level" may refer to the use of the carrier-frequency amplitude-modulated IF-curves.

Since two reflections, which although from different locations nonetheless overlap, of carrier-frequency pulses or carrier-frequency bursts, depending on the mutual phase angle of the two carrier oscillations that form part of the reflection, may add up to form an overall reflection, one reflection can interfere with the other. Subtraction of one of the interfering reflections can essentially only provide a true image of the other reflection if the carrier-frequency pulses as well as their envelope form the basis of the subtraction. This may mean that storing only the envelope of the interference reflection and its subsequent subtraction may result in an essentially incorrect image of the second reflection, which is of interest.

However, if the carrier-frequency curve of the interference reflection has been stored, i.e. if the interference reflection is stored at the IF-level, and may then be deducted from the carrier-frequency curve of the overall reflection, then precisely the second reflection, which is of interest, may remain essentially without distortion.

This essentially undistorted determination of the reflection may be achievable by sampling and digitising the IF-interference curve as well as by sampling the IF-echo curve. If the curves are present in their sampled shape, then it may essentially only be necessary to subtract the values of the interference curve from the values of the echo curve for the respective identical distances. From the result, i.e. from the sampled and subtracted IF-curve, it may then be possible, for example, to form an envelope that essentially reflects the undistorted reflection curve, corrected by the interference reflections.

In order to make it possible to carry out a comparison, the interference profile may also be recorded as an IF-interference profile. However, sampling the higher-frequency IF-profile may result in a greater number of sampling values than does storing the envelope. According to Nyquist's sampling criterion this higher number would result from sampling a higher-frequency IF-frequency. In particular in the case of digital processing, a greater number of data to be processed could arise. The method of sampling in pairs or offset sampling in pairs may make possible a reduction in the sampling values.

From the sampling values of the IF an envelope may be able to be calculated, as may, for example, be described in DE 10 2006 006 572 A1.

Subtraction at IF-level may take place in a time range of the echo functions. For example, the IF-oscillation may be of a constant frequency. The time range may differ from a frequency range, wherein the time range and frequency range can be transformed into each other by means of a transformation. Subtracting the IF in a time range may take into account the presentation of the IF-echo function by way of a time coordinate. Determining a spectrum may be prevented by calculation in the time range.

In one example a pulse transit-time filling-level sensor may be used, in which the signals are transmitted in the direction of the feed material surface in the form of pulses or bursts, in other words in short signal trains.

Thus, a rigidly set frequency may be used which in a frequency range may have an essentially rigidly allocated position.

In order to define a virtual zero point, each transmission pulse may be divided into a component guided onto the measuring path, and a component guided internally to the receiver. The component guided internally to the receiver can be used as a time reference mark for the reflections received by the measuring path. In the time diagram of the echo function this so-called reference echo marks the virtual zero point. The transit times of the reflected signals can be referenced to this virtual zero point. The reference pulse can be used as a reference variable for measuring echoes.

As a result of the reduction in the power of the proposed measuring method the measuring method may be able to be used with two-conductor sensors which may be supplied with energy by way of the measuring line by means of a power control loop.

According to a further exemplary embodiment of the present invention, a computer-readable storage medium may be provided, which may comprise a program element, wherein, when the program element is executed on a processor, an echo curve may be generated. Furthermore, the echo curve may be analysed by means of at least one analysis method, which may be selected from a group of analysis methods, wherein the group may comprise analysing by means of at least two parallel tasks and analysing the echo curve by comparison with a standard echo curve at the IF-level.

In one example parallel tasks may be processed in parallel.

The term "computer-readable storage medium" may refer to a floppy disc or a hard disc, a USB-storage medium (Universal Serial Bus), a RAM (Random Access Memory), a ROM (Read Only Memory) or an EPROM (Erasable Programmable Read Only Memory). However, a computer-readable storage medium may also refer to a data network, for example, the internet, which makes it possible to download a program code.

According to a further exemplary embodiment of the present invention, a section of the echo curve may be analysed.

In particular in the case of division into two tasks, by means of section-by-section analysis the expenditure for measuring the echo curve may be able to be reduced. The section may be referred to as a "window".

According to a further exemplary embodiment of the present invention, for determining the echo curve at least one method may be used, selected from the group of methods comprising a transit time method, a pulse transit time method, a frequency-based method, an FMCW-method (Frequency Modulated Continuous Wave) and a frequency-modulated method.

In an FMCW-method a multitude of different frequencies may be used.

According to another exemplary embodiment of the present invention, the method for filling level measuring may involve storing the echo curve and/or the spurious-echo curve by sampling the echo curve in pairs at the IF-level and/or by offset sampling the echo curve in pairs at the IF-level.

According to a further exemplary embodiment of the present invention, the at least two parallel tasks may be started at a point in time of triggering. The point in time of triggering the at least two tasks may comprise a pulse sampling ratio (or pulse duty ratio) other than 50%. Thus one task may be able to occupy a processor for a longer period of time than the other task.

In other words, the points in time of triggering may start time slices that are allocated to durations or particular tasks. During the started durations the particular task may be carried out and the durations of the tasks may have a sampling ratio relative to each other. This may mean that the durations of occupation of the processor and the tasks comprise a sampling ratio relative to each other.

Thus, for example, the sampling ratio may represent an allocation to a time slice or an allocation duration for a processor. For example, an evaluation method or an evaluation task may have a shorter allocation duration to a processor than does a measuring task. Therefore a complete measuring task during the entire allocation time to a processor may be able to be met, while an evaluation task may be carried out in several interrupted allocation time slices. The evaluation process or the evaluation task can be interrupted by the measuring task. By means of interrupting, a higher measuring rate for the measuring task may be able to be set than for the evaluation task.

However, by means of the division into processes or tasks that may be carried out in parallel, it may be possible to take into account the circumstance that the macro position of an echo may change more slowly than the micro position. This may mean that the approximate position of the echo, viewed over a short period of time, may essentially be constant, while the exact micro-position may change within short intervals, for example, due to an unsettled feed material surface as a result of the feed material container being filled up or emptied.

According to another exemplary embodiment of the present invention, the points in time of triggering may determine the allocation of the at least two parallel tasks to a shared executing device. A processor, a microprocessor or a microcontroller may be an example of an executing device or a control device.

According to yet another exemplary embodiment of the present invention, the method for filling level measuring may comprise a first task which may be equipped for selecting a section or a window of an echo curve.

A second task of the at least two parallel tasks may be equipped for analysing the selected section of the echo curve, or for measuring the respective section.

According to yet another exemplary embodiment of the present invention, in order to select a section of the echo curve a window region may be formed, and the echo curve may essentially be evaluated within the window region. This may mean that for determining the essentially precise position of the echo only that part of an echo curve may be evaluated which is positioned within the time interval of the determined window region.

According to yet another exemplary embodiment of the present invention, analysis or measuring the selected section of the echo curve may comprise the application of an echo analysis method. The echo analysis method may be at least one method selected from the group of echo analysis methods, wherein the group of echo analysis methods may comprise slope measuring, interpolating, determining an amplitude increase at the beginning of the echo, determining a maximum amplitude of the echo, providing sample signals (i.e. reference signals) and correlating.

According to a further exemplary embodiment of the present invention, the at least two parallel tasks may comprise essentially different repeat rates. The repeat rates may be able to be determined by setting the sampling ratio, the allocation algorithm or the duration of allocation to the processor.

According to a further exemplary embodiment of the present invention, comparison at the IF-level may involve subtracting an IF-interference curve from an IF-echo curve. Of course, an IF-echo curve may also be subtracted from an IF-standard curve. The term "IF-interference curve" or "IF-spurious-echo curve" can refer to a standard echo curve in which there may not have been any formation of an envelope.

According to yet another exemplary embodiment of the present invention, comparison at IF-level of the IF-curve may comprise sampling in pairs and/or offset sampling in pairs.

By means of sampling an IF-signal in pairs, an envelope with few supporting points may be able to be determined, and as a result of this not only can the IF-echo curve be compared, for example, to an IF-standard echo curve, but the associated envelopes can also be compared to each other.

According to a further exemplary embodiment of the present invention, the measuring device may be selected from a group of measuring devices, wherein the group of measuring devices comprises a filling-level measuring device, a limit-level measuring device, a measuring device based on the transit time principle, a microwave transit-time measuring device, a TDR (Time Domain Reflectometry) measuring device, a measuring device based on the principle of the guided microwave, a radar measuring device, an ultrasound transit-time measuring device, a distance measuring device, a collision measuring device and an echo measuring device.

It should be noted that different aspects of the invention have been described with reference to different objects. In particular, some aspects have been described with reference to device-related claims, whereas other aspects have been described with reference to method-related claims. However, the person skilled in the art can see from the above description and from the description below that, unless otherwise described, in addition to each combination of features that form part of a category of objects any combination of features that relate to different categories of objects is also covered and disclosed. In particular, combinations of features of device-related claims with features of method-related claims are also disclosed.

Below, further exemplary embodiments of the present invention are described with reference to the figures.

SHORT DESCRIPTION OF THE FIGURES

FIG. 9a shows various sections of an echo curve with different amplification in the form of an envelope, according to an exemplary embodiment of the present invention.

FIG. 9b shows a further illustration of the various sections of an echo curve with different amplification of FIG. 9a, according to an exemplary embodiment of the present invention.

DETAILED DESCRIPTION OF EXEMPLARY EMBODIMENTS

Figure 1:
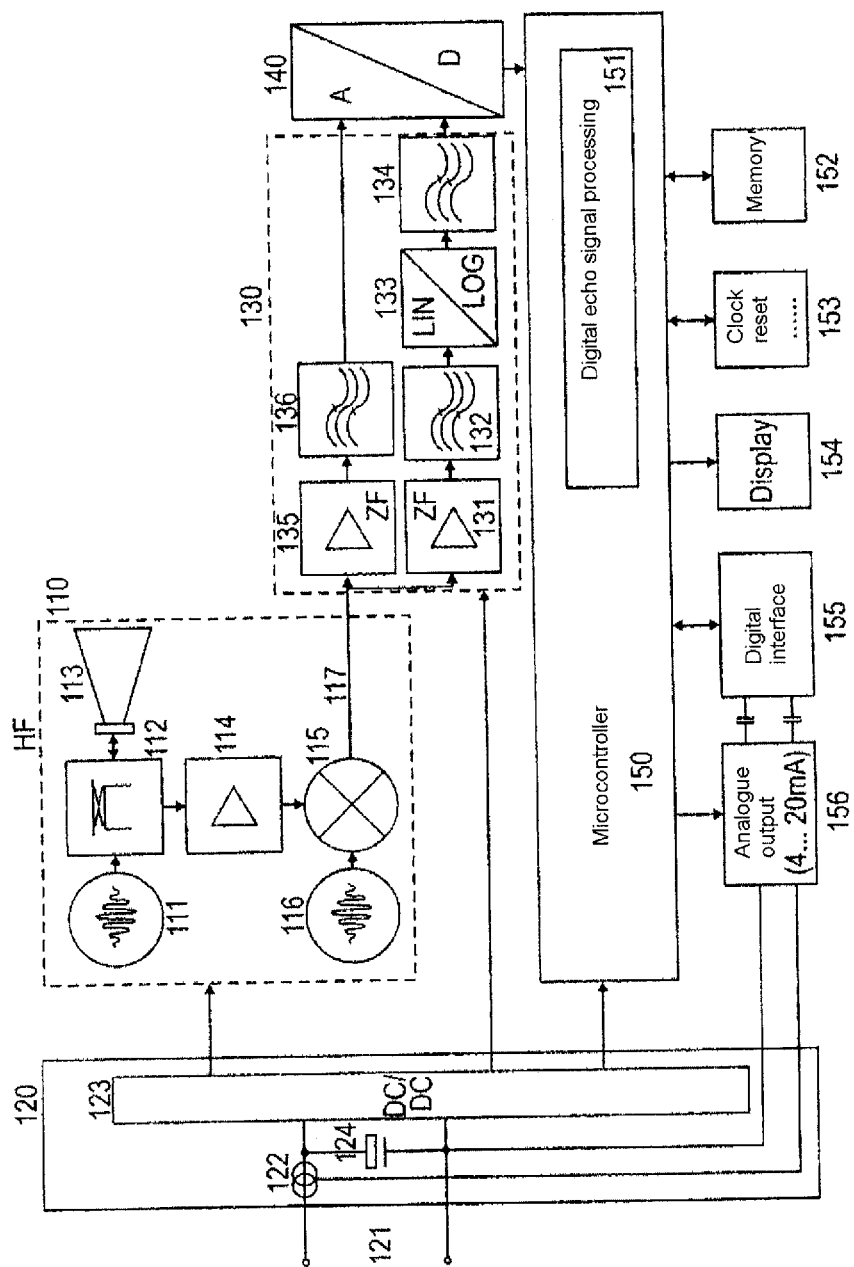
FIG. 1 shows a block diagram of a radar filling-level sensor which operates according to the pulse transit-time method, to provide an improved understanding of the present invention.

The illustrations in the figures are diagrammatic and not to scale.

In the following description of the figures the same reference characters are used for identical or similar elements.

FIG. 1 shows a block diagram of a radar filling-level sensor which operates according to the pulse transit-time method, to provide an improved understanding of the present invention.

The transit-time filling-level sensor, in particular the radar filling-level sensor comprises a high-frequency circuit part 110, a power supply (also called power pack) 120, an analogue signal processing device 130, an A/D-converter 140 and a microcontroller 150 with a periphery. The examples of peripheries shown in FIG. 1 are: the storage device 152, the display 154, the clock-pulse and reset circuit 153. The sensor is, for example, supplied, by way of the two-wire line 121, which forms part of the power-control loop, by way of which the filling level value is also output in analogue form, by the controlled current sink 122 and the controller 156 impressed as a current of 4 . . . 20 mA. On the supply line 121 at the same time digital communication between the sensor and the outside world can take place. This is physically made possible by the digital interface 155. The power pack comprises a DC/DC-converter 123 (DC/DC-converter or DC/DC transducer) with an upstream storage capacitor 124 for supplying all the other circuit parts.

The high-frequency circuit 110 comprises a transmit generator 111 for generating high-frequency transmission pulses of a predetermined pulse repetition frequency. These are guided to the antenna 113 by way of the directional coupler 112 or as an alternative by way of a circulator 112, and are radiated from said antenna 113. A predetermined component of the transmission pulse travels by way of the directional coupler 112 directly to the receiving amplifier 114; it forms a time reference mark or, expressed more simply, a reference echo. This is followed in time by the echo from the reflection of the emitted transmission pulse on the feed material surface and any spurious echoes, for example echoes of further obstacles that may be present in the propagation path of the microwaves. Spurious echoes can, for example, originate from ladders that are affixed in the feed material container or from agitators. These echoes are received by the antenna 113, and by way of the directional coupler 112 are guided to the receiving amplifier 114.

After amplification, both the reference echo and the further echoes reach the sampler or mixer 115. There they are sampled with a second pulse sequence with the same carrier oscillation (same frequency) as the transmission pulses 111, but with a slightly different pulse repetition frequency. The second pulse sequence is generated in the sampling generator 116. As a result of this sampling an IF-signal 117 (intermediate-frequency signal) arises, which in a time-extended form essentially comprises all the echoes of the high-frequency signal of the receiving amplifier 114. The high-frequency carrier signal of the transmission pulses or of the sampling pulses is thus converted to a signal with a low-frequency intermediate frequency (IF), which in a time-extended form comprises an amplitude curve that is identical to that of the high-frequency signal of the receiving amplifier 114.

The amplitude curve of the IF-signal or its envelope shows the reflection conditions of the monitored measuring path when the amplitude curve of the IF-signal is plotted over time. In filling-level measuring devices the amplitude curve of the IF-signal or the amplitude curve of the envelope thus shows the reflections or the echoes from the feed material container. The analogue signal, which by plotting the amplitude curve in its time gradient shows the reflection conditions of the monitored measuring path, is generally referred to as the "analogue echo curve" or "echo signal".

Figure 3:
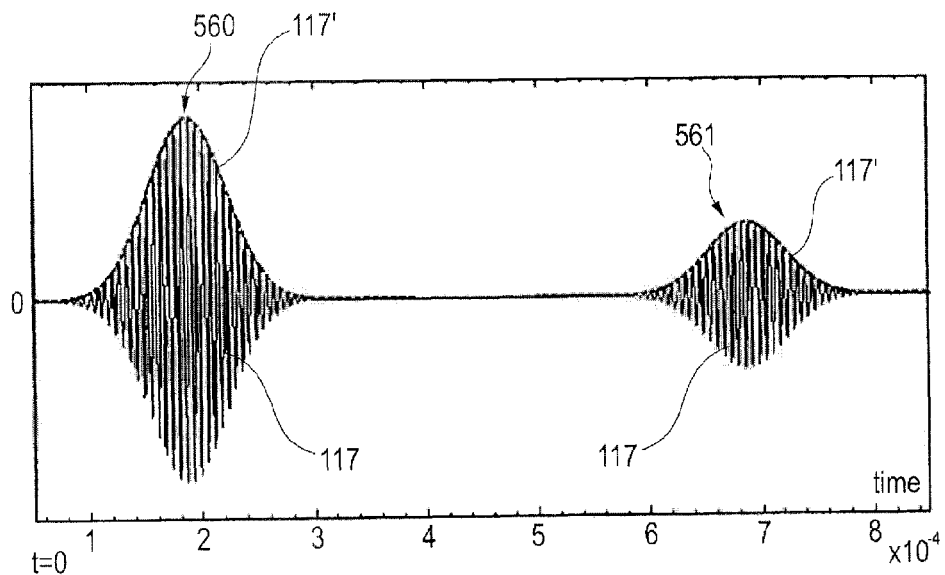
FIG. 3 shows the form of an idealised IF-signal and its envelope, according to an exemplary embodiment of the present invention.

In this context reference is made to DE 31 074 44, which describes the function of this time-extension method in detail. FIG. 3 shows a considerably simplified idealised IF-signal 117. The IF-signal is enveloped by the envelope 117'. In this example a radar frequency 111 of 24 GHz and a time-extension factor of 150,000 may be selected. This results in an IF-carrier oscillation 117 of 160 kHz, which has been reduced by a factor of 150,000 when compared to the transmission frequency. The propagation constant of microwaves, of approximately 3.33 ns/m, which constant results from the speed of light, is extended, by a factor of 150,000, to 0.5 ms/m. Because of the way there and the way back, at the IF-level this results in a time difference of 1 ms between two echoes whose mutual distance is 1 m. The echoes of an IF-signal are plotted over this time scale.

For the sake of simplicity, in the idealised IF-signal of FIG. 3 only two echoes 560, 561 are plotted with a mutual interval of approximately 0.5 ms, corresponding to 0.5 m. The echo 560 is the reference echo, while the echo 561 represents the reflection from the feed material surface. As already mentioned, real IF-signals often comprise further spurious echoes that can make evaluation of the signal more difficult.

The duration of the IF-signal is guided by the sensor's measuring range that is of interest. In the IF-signal curve shown in FIG. 3 the duration of the IF-signal is from t=0 ms to the point in time t=0.85 ms, and is thus 0.85 ms. In FIG. 3 a very short measuring range was selected so as to better show the IF-oscillation. The measuring range results from the duration of the IF-signal of 0.85 ms. This duration consequently corresponds to a measuring range of 0.85 m.

Each echo of the IF-signal comprises an amplitude-modulated carrier oscillation of the IF-frequency. The sought distance information can be determined from the amplitude curve and possibly also the phase curve of the IF-oscillation 117.

To obtain this information, according to the method shown in FIG. 1 or the circuit shown in FIG. 1, the IF-signal 117 is processed by way of the analogue signal processing device 130, and thereafter is converted to discrete digital values by means of the analogue-digital converter 140. These digital values are saved in the storage device 152 so that the microcontroller 150 can access the digitised values of the analogue echo curve. These digital values can generally be designated a digital echo curve, which includes both the sampled values of the IF-oscillation 117, and amplitude values 117' and/or phase values of the IF-oscillation, which were derived from said IF-oscillation 117. The derived amplitude values 117' are referred to as the envelope 117'.

In the shown exemplary embodiment of analogue signal processing 130, preparation of the analogue signal takes place largely separately according to the amplitude information and the phase information. For amplitude information a hardware logarithmic amplifier 133 is used which rectifies the IF-signal 117 and takes the logarithm. The amplifier 131 is used to match the IF-signal 117 to its level range, while the bandpass filter 132, by means of filtering out as far as possible all the unwanted signals outside the IF-frequency band of the IF-frequency, improves detectability of even the smallest echoes. The low pass 134 downstream of the logarithmic amplifier smoothes out the resulting envelope by removing IF-frequency components.

If the amplitude dynamics in the IF-signal 117 exceed the dynamics of the logarithmic amplifier 133, then the amplification of the IF-amplifier 131 can be varied.

The amplitude dynamics characterise the range between the lowest still-detectable amplitude and the highest amplitude that can still be processed by the system without major distortion. In this process the time factor is of no consequence. The dynamic range of the echo signal of the HF-circuit 110 can exceed the dynamic range of the logarithmic amplifier 133. As a result of logarithmic conversion the dynamic of the echo signal is compressed so that the downstream A/D-converter 140 can process the echo signal essentially without any problem. Without compression as a result of logarithmic conversion the echo dynamic range may possibly pose a problem to the A/D-converter.

Variation in the amplification of the IF-amplifier, i.e. the amplification change of the IF-amplifier 131, can take place in a step-by-step manner or continuously for the duration of an IF-signal, or it can be stepped from one IF-signal to the next. If the applied amplification change is known, the microcontroller 150 can correct and combine the digitalised logarithmic envelopes that have arisen in this way in such a manner that correct amplitude information for all echoes is present.

In order to obtain phase information, according to the exemplary embodiment of FIG. 1 the signal path with the IF-amplifier 135 and with the bandpass filter 136 is used. The IF-amplifier 135 adapts the amplitude of the IF-signal 117 to the voltage range of the A/D-converter 140, and the bandpass filter 136 at the same time serves to filter out noise components and as an anti-aliasing filter for the subsequent analogue to digital conversion.

In the transition from the analogue to the digital level Nyquist's sampling theorem should be taken into account, which states that the sampling frequency should be at least twice as high as the highest frequency that occurs in the signal. In order to meet this requirement, on the one hand the analogue low-pass filtering or bandpass filtering of the IF-signal 117 prior to sampling can be used, and on the other hand rather generous oversampling can be used, which in the example stated above can lead to sampling frequencies greater than 500 kHz. Since, as already mentioned, the amplitude dynamics in the IF-signal 117 can be very high, it may be necessary to select an A/D-converter with a high amplitude resolution, i.e. with a high bit width. Such high-resolution A/D-converters that at the same time convert quickly are, however, hardly available, considering the additional aspects of reduced power consumption and justifiable costs.

As far as a reduction in the required amplitude resolution of the converter is concerned, in this arrangement too, as described above in the context of forming the analogue envelope, an analogue IF-amplifier 135 with STC-function (Sensitivity Time Control) or an amplifier with stepped amplification can be provided.

With stepped amplification several digitised IF-signals of different amplification can be mathematically combined to form a complete IF-signal with high dynamics. The same applies to stepped switching of the amplifier within an IF-signal 117. Of course, it is also possible, instead of using an IF-amplifier 131, 135 whose amplification is variable, to use several amplifiers of a parallel design with different amplification, whose signals are converted by the A/D-converter quasi simultaneously, or instead in sequence. However, in each case it should be kept in mind that in favour of reduced amplitude resolution of the A/D-converter 140 higher demands are posed in relation to sampling frequency, storage device requirement and/or utilisation or processing speed of the microcontroller 150 for digital echo signal processing.

Figure 2:
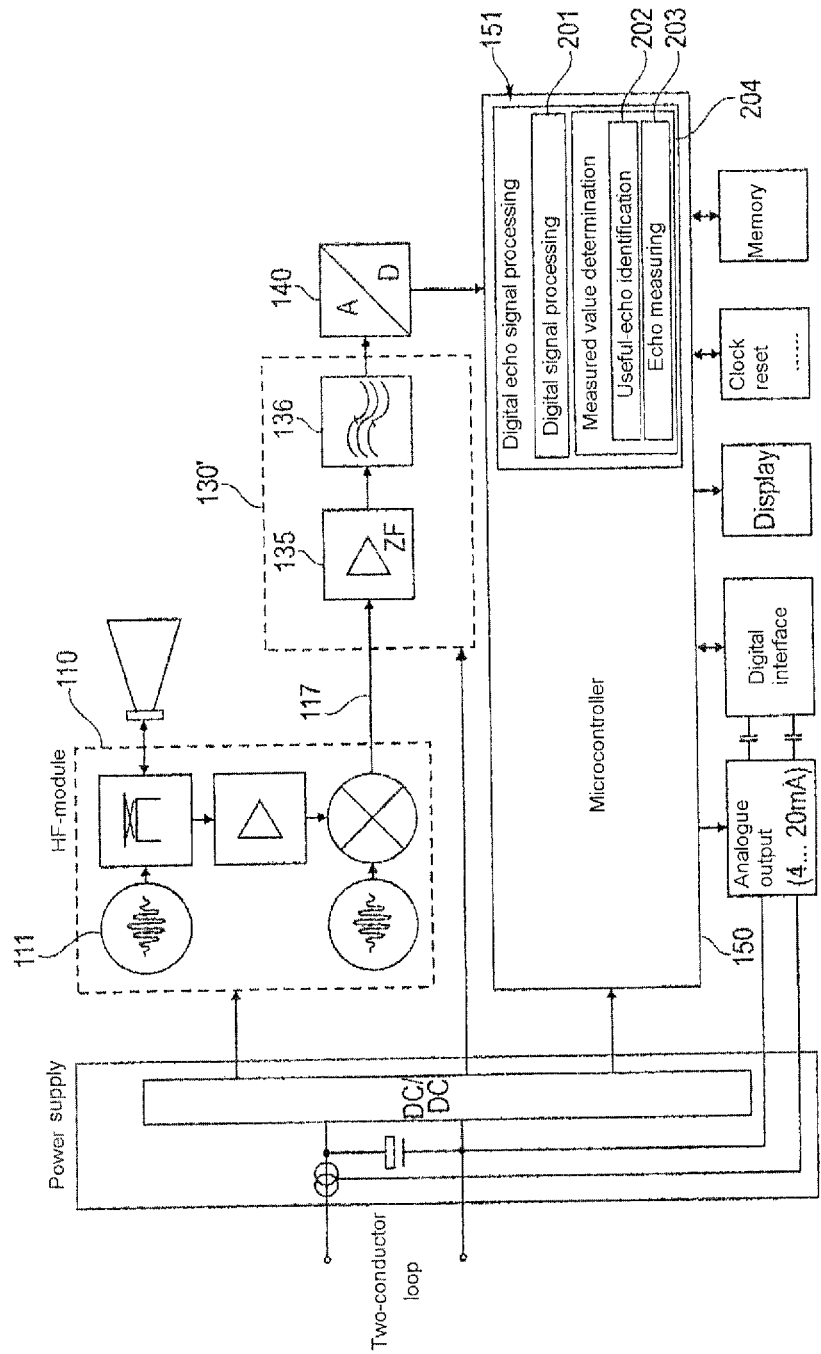
FIG. 2 shows a block diagram of a radar filling-level sensor without direct envelope formation in analogue signal processing, according to an exemplary embodiment of the present invention.

FIG. 2 shows a block diagram of a radar filling-level sensor without direct envelope formation in analogue signal processing.

FIG. 2 differs from FIG. 1 in the region of analogue signal processing 130' and in its more detailed illustration of digital echo-signal processing 151. This example does without the branch 131, 132, 133, 134 to form the analogue logarithmic envelope, because the envelope can be calculated from the sampled digital values of the IF-signal.

This calculation of the envelope will be discussed in more detail in FIG. 7.

By way of the IF-amplifier 135, the band filter 136 and the A/D-converter (analogue-digital converter) 140 the IF signal 117 is fed to digital echo-signal processing 151. Digital echo-signal processing 151 comprises digital signal pre-processing 201 or a signal pre-processing device 201. Furthermore, digital echo-signal processing 151 comprises measured-value determination 204 or a measured-value determination device 204. This in turn comprises useful-echo identification 202 or a useful-echo identification device 202, as well as echo measuring 203 or an echo measuring device 203. The formation of two independent tasks takes place within echo evaluation 204 or within the measured-value determination device 204. A first task may run in the useful-echo identification device 202 and a second task may run in the echo measuring device 203.

In the context of this document the term "functional block" 201, 202, 203, 204 may refer to a general functional unit or a device that carries out a corresponding function. For example, a functional block can be implemented as a task and/or as an integrated switching circuit, i.e. in software and/or in hardware. A task can, for example, be executed on a processor 150 or microcontroller 150.

Figure 4:
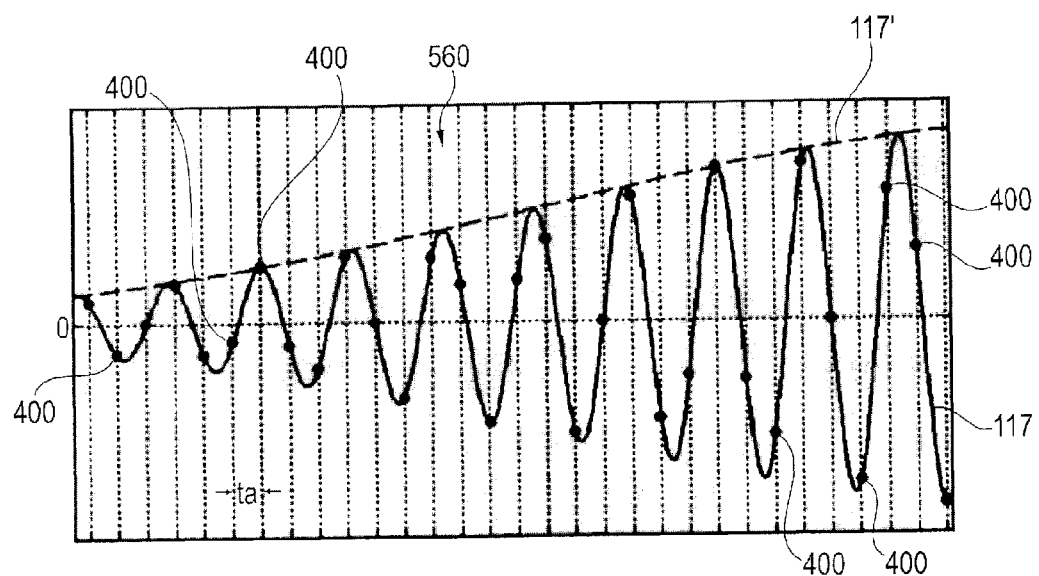
FIG. 4 shows a section of the form of the IF-signal of FIG. 3 with equidistant sampling points, according to an exemplary embodiment of the present invention.
Figure 5:
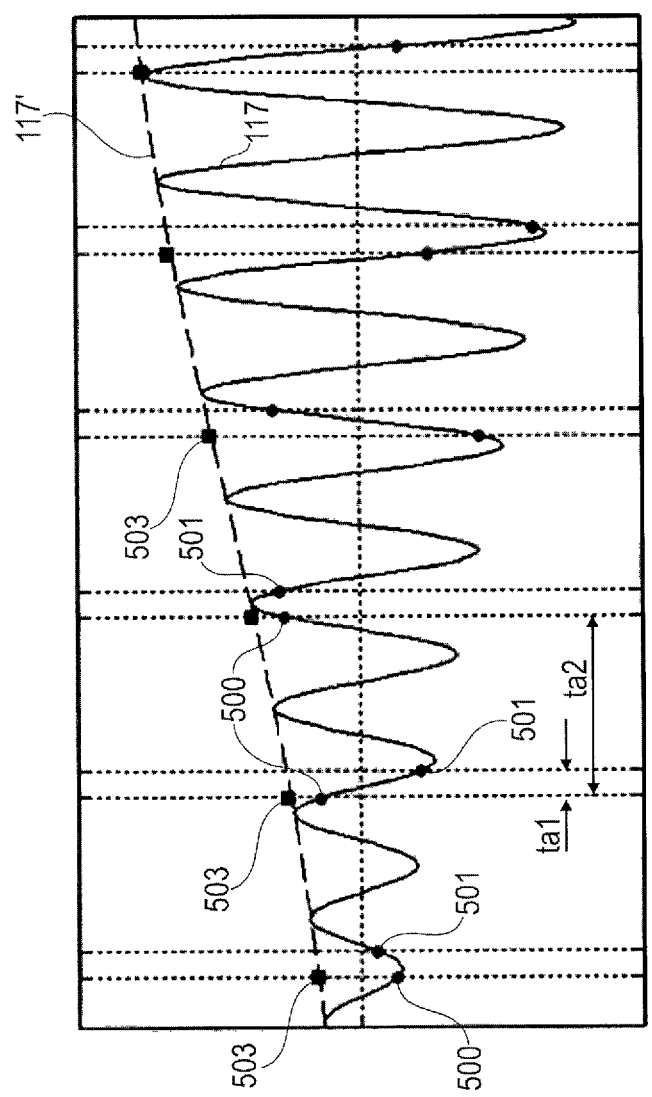
FIG. 5 shows a section of the form of the IF-signal of FIG. 3 with sampling in pairs, and with envelope points calculated therefrom, according to an exemplary embodiment of the present invention.

By means of sections from the gradients of an IF-curve, FIG. 4 and FIG. 5 show the way a digital echo curve 400 or digital IF-echo curve 400 can arise from an analogue IF-echo curve 117 by means of time-discrete sampling. FIG. 4 shows a section of an IF-signal 400 sampled according to Nyquist's sampling theorem. The diagram shows the first half of the echo 560 from FIG. 3 with the original IF-curve 117 and the equidistant sampling points 400 at a time interval ta, from which sampling points a digital value is formed. Furthermore, the envelope 117' is shown in a dashed line. The sampling interval ta that is shown in this example is 1.95 µs (microseconds) or 1.95 us corresponding to a sampling frequency of 512 kHz, which is approximately three times the IF-carrier frequency of 160 kHz.

In relation to the same time-section from the IF-signal 117 as shown in FIG. 4, FIG. 5 shows an advantageous sampling grid of so-called sampling in pairs. With sampling in pairs, cyclically two sampling processes 500, 501 are carried out at a time interval of ta1, wherein the first value 500 is assigned to a first group and the second value 501 is assigned to a second group. This sampling in pairs 500, 501 is repeated at a time interval ta2. The respective sampling values 500, 501 are entered as points on the IF-signal 117. The envelope values 503 that are calculated according to a calculation rule from each sampling pair are shown in FIG. 5 as solid squares on the dashed ideal envelope 117'. In this example a period of time that corresponds to a quarter of the cycle duration of the IF-frequency was selected for the time interval ta1.

During this time ta1 the envelope value 503 changes only insignificantly, and for this reason the calculation error that arises in relation to the envelope 117' remains relatively small. When determining the envelope 117', selecting a quarter of the cycle duration can simplify calculation of the values so that it only involves taking the square root from the sum of squares of the two sampling values 500, 501. However, other time intervals between the two points of a pair and between the individual pairs are also possible. In this context, reference is made to DE 10 2006 006 572 A1.

By means of sampling in pairs, shown in FIG. 4 or 5, digital values 400, 500, 501 and 503 can be formed which represent or characterise the echo curve 117 and/or the envelope 117'. For example, from the values 500, 501 that have been sampled in pairs the approximate envelope 503 of an IF-signal 117 can be calculated. In addition or as an alternative to calculation of the envelope 503, the phase position of an echo can also be calculated from it. In this context, reference is made to DE 10 2006 006 572 A1.

Figure 6:
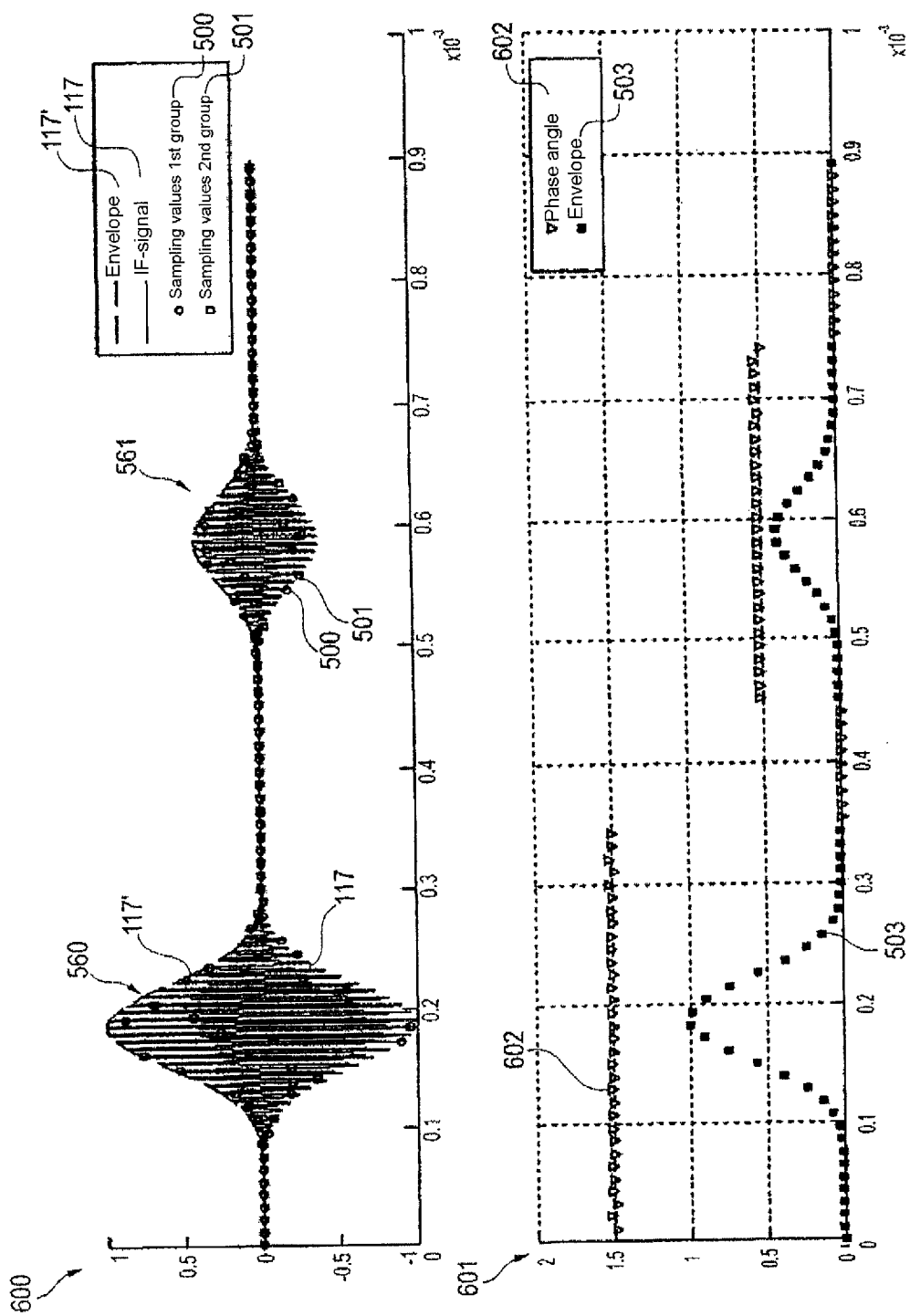
FIG. 6 shows the form of the IF-signal of FIG. 3 with sampling values of sampling in pairs, and with envelope values and phase values calculated therefrom, according to an exemplary embodiment of the present invention.

The upper part 600 of FIG. 6 shows an idealised IF-signal 117, over a time axis, corresponding to the signal 117 from FIG. 3, with sampling values 500, 501 of sampling in pairs being indicated.

The lower part 601 shows the envelope 503, calculated from the sampled digital values, as well as the curve of the phase angle 602, expressed in the unit rad. The totality of these digital values or parts thereof form the digital echo curve, which forms the basis of digital echo signal processing.

Figure 7:
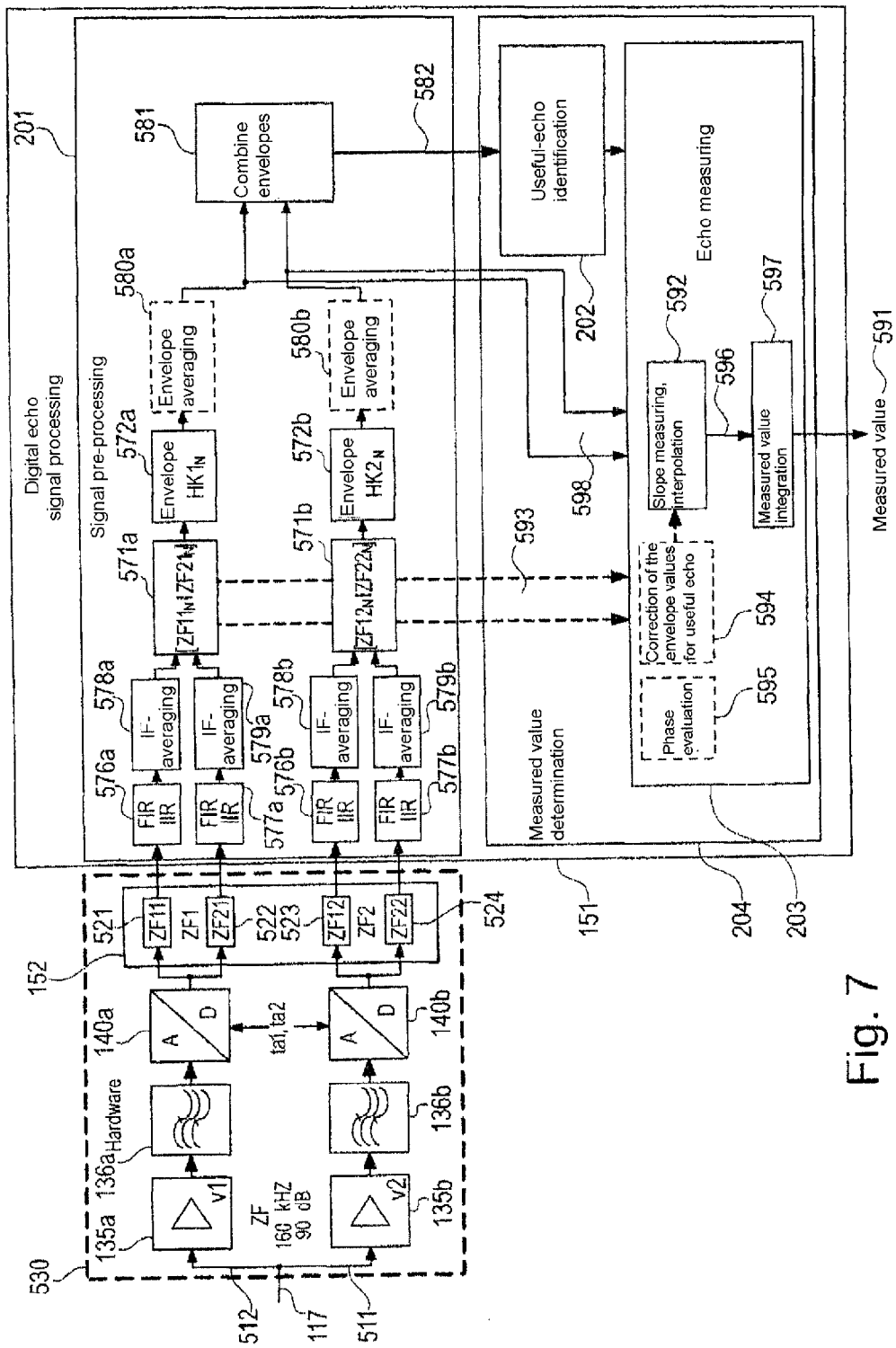
FIG. 7 shows a block diagram with IF-sampling in pairs, and with subsequent digital echo signal processing, according to an exemplary embodiment of the present invention.

FIG. 7 shows a block diagram with analogue and digital signal processing for a pulse transit-time filling level sensor, according to an exemplary embodiment of the present invention.

The block diagram according to FIG. 7 takes account of the high signal dynamics or sensor sensitivity in that the IF-signal 117 is divided into two parallel channels 512, in which IF-amplifiers 135a and 135b of different amplifications v1 and v2 are provided. The divided signal 117 is processed in the two IF-amplifiers 135a, 135b at the same time. Dividing the IF-signal into the two channels 512, 511 by means of switches would be imaginable. Correspondingly, two analogue bandpass filters 136a and 136b and two A/D-converters 140a and 140b are also present. It is assumed that the resolution of a single A/D-converter 140a, 140b on its own is not sufficient to digitise both the largest and the smallest echoes. However, if this were possible, a single-channel design would be adequate.

Each A/D-converter 140a, 140b converts the sampling values of the IF-signal 117 according to the schematic diagram or sampling grid ta1, ta2, shown in FIG. 5, of offset sampling in pairs, in two groups IF1 and IF2 which are saved in the storage device 152 for further digital processing within the digital signal processing device 15. It should be mentioned that the task of the two A/D-converters can also be carried out by a single A/D-converter that comprises at least two inputs.

Figure 8:
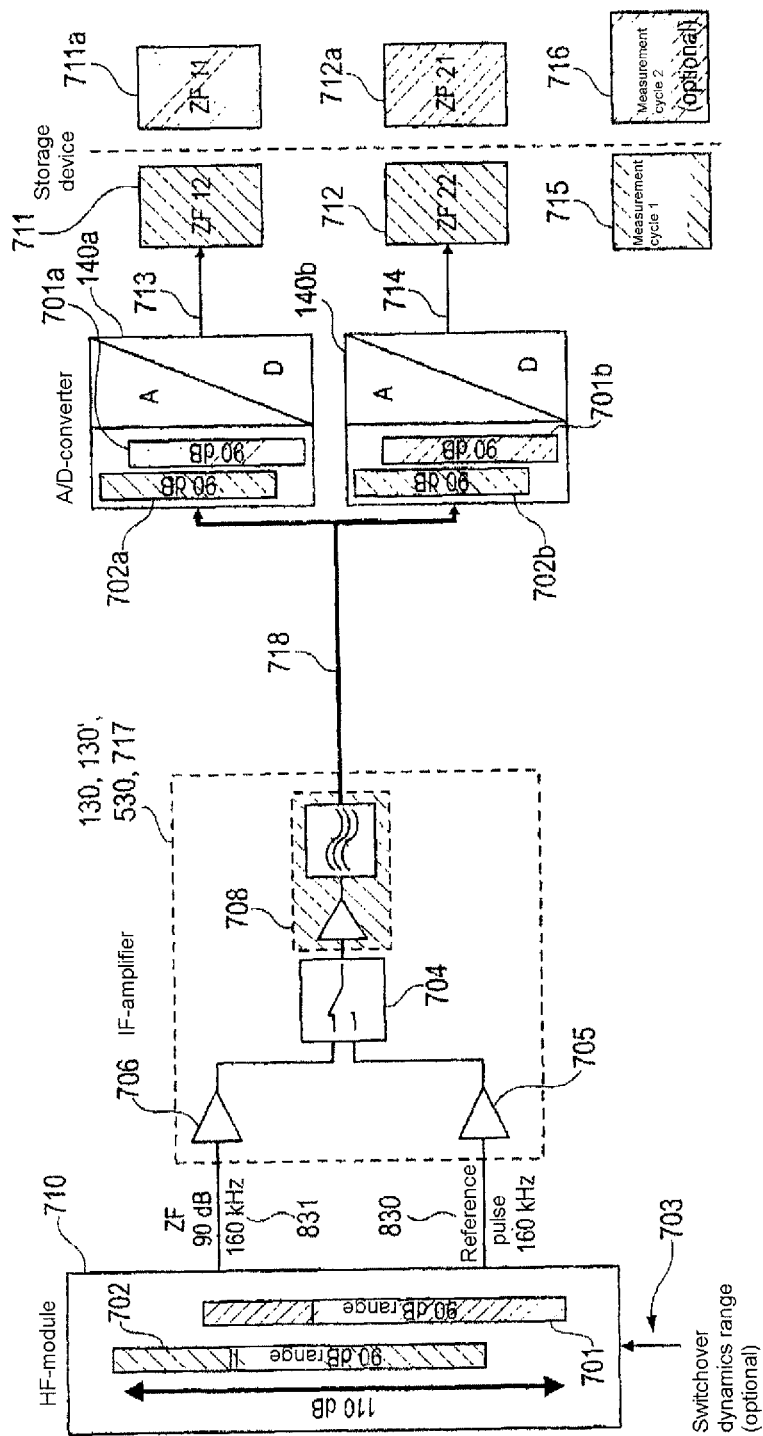
FIG. 8 shows a further block diagram for IF-sampling in pairs for pulse transit-time measuring, comprising two A/D-converters, according to an exemplary embodiment of the present invention.

FIG. 8 shows a block diagram for IF-sampling in pairs with two A/D-converters, according to an exemplary embodiment of the present invention.

In contrast to parallel analogue signal processing 135a, 135b, 136a, 136b and to parallel A/D-conversion 140a, 140b of FIG. 7, in the block diagram according to FIG. 8 the division into two different dynamics ranges is not carried out concurrently or in parallel, but instead in sequence with switchover in between. In this arrangement the two A/D-converters 140a, 140b shown in FIG. 8 are not used for division into two dynamics ranges, but instead, in relation to sampling in pairs of the IF-curve in each case, a sampling point of a pair is converted by one A/D-converter 140a, and the other sampling point of the pair is converted by the second A/D-converter 140b.

FIG. 8 shows an analogue signal processing stage 130, 130', 530, 717 for this purpose, which signal processing stage 130, 130', 530, 717 extends from the HF-module 710 to the storage device 711, 712, 711a, 712a. The analogue signal processing stage 130, 130', 530, 717 is based on analogue signal processing methods. While in the block diagram of FIG. 7 switchover of the amplification is achieved by separate paths 512, 511 and thus takes place within the IF-stage 530 or the IF-amplifier stage 530, switchover in the block diagram according to FIG. 8 takes place by means of switchover within the HF-module 710.

In other words, FIG. 8 shows a further switchover option. In FIG. 7 the two divided channels 511, 512 are present. In FIG. 8 the two channels arise internally in the HF-module as a result of the switchover device 703 (range I and range II). FIG. 8 differs in that, in a manner that differs from the illustration in FIG. 3, the reference echo 560 and the remaining echoes from the monitored measuring path are not present as a uniform time signal but instead as two separate signals which are correlated in time with each other. Separation of the reference echo 560 or reference pulse 601 from the remaining echoes 603, 607, 608 takes place, including from the useful echo 607.

This separation can be a location-related separation, i.e. separation into different channels 830, 831, and/or a separation in time. In other words, local multiplexing and/or time multiplexing, or local demultiplexing and/or time demultiplexing may be carried out.

The illustration in FIG. 9a shows the correlation in time of the signals, wherein the correlation in time is expressed by the common time axis.

In FIG. 7 it is assumed that the reference echo and the remaining echoes are present in a common signal, and that "switchover" of the amplification or "switching over" of the amplification is not a true switchover, but instead a division into two parallel channels with different amplification.

In contrast to this, FIG. 8 shows that the reference echo 560, 601 and remaining echoes exist separate from each other in two signals, between which signals switchover is possible. Furthermore, switchover of amplification takes place in the HF-module and is a true switchover, i.e. a less amplified signal (range II) or a more amplified signal (range I) is available at the same output 831.

By means of an HF-switchover device 703 it is possible to switch over between the dynamic ranges 701, 702 of the analogue signal processing stage 130, 130', 530, 717 and in particular between the dynamic ranges 701a, 702a, 701b, 702b of the A/D-converters 240a, 240b. The HF-switchover device 703 can, for example, switch over the amplification of a HF-transmitting amplifier or an HF-receiving amplifier. For example, switching between two amplifications of different magnitude can take place.

Furthermore, by means of the switch 704 it is possible to switch over between two IF-amplifiers 705, 706. In this arrangement the first IF-amplifier 706 amplifies the IF-signal that has been described so far with the reflections of the measuring path. The second IF-amplifier 705 provides an amplified IF-signal of a reference pulse 601 (in FIG. 9a the reference pulse 601 is only shown as an envelope rather than as an IF-signal). The reference pulse is, for example, generated internally in the HF-circuit 110 as a separate echo from the transmission pulse, which echo as a result of being internally generated is used as a location reference or a time reference for the echoes received by way of the antenna 113. The switch 704 can, for example, be equipped so that after the complete reference pulse has been received, the switch 704 switches over from the first IF-amplifier 705 to the second IF-amplifier 706. As an alternative, switching over can also take place after part of the reference pulse has been received, i.e. at the falling slope.

After the respective signal has passed through the switch 704, further amplification and bandpass filtering of the IF-signal, which in each case has been selected by way of the switch 704, can take place in the IF-amplifier 708. Here again it should be noted that the respective signal 601, 602, 602' is the IF-signal rather than the envelope, which for the sake of simplicity is shown in FIGS. 9a, 9b. The IF-signal, which is present at the output of the switch 704 and, in particular, is present at the output of the signal path 708, is divided over the path 718 between the two A/D-converters 140a, 140b for sampling in pairs. The first A/D-converter 140a converts, for example, always the first value 500 of a sampling pair, while the second A/D-converter 140b always converts the second value 501. In other words, this may mean that the A/D-converters 140a, 140b obtain the same curves. The first converter may sample the first values 500, and the second converter may sample the second values 501. Thus each converter may generate only part of the sampling values 500, 501. The sampling points in time of the first A/D-converter and of the second A/D-converter may be shifted by ta1.

Since the time intervals ta1 between the two values of a pair are significantly smaller than the time intervals ta2 between subsequent pairs, with this arrangement it becomes possible to use A/D-converters with a relatively low sampling rate e.g. 1/ta2.

It is also possible to convert all the points 500, 501 or sampling values 500, 501 with the use of a single A/D-converter that is correspondingly fast. Likewise, it is not mandatory to carry out sampling in pairs. Equidistant IF-sampling, taking into account Nyquist's sampling theorem, in other words at an IF frequency of, for example, 160 kHz, at least at a sampling frequency greater than 320 kHz, also results in a digital echo curve that can be evaluated by means of digital echo signal processing. However, the requirements relating to the performance of the A/D-converters, and thus possibly the associated expenditure, may be considerable with the use of fast A/D-converters.

If, in the HF-circuit, low amplification is preset by way of the HF-switchover device 703, the rather large echoes from the dynamic range II 702 are assigned to the two groups IF12 and IF22 by way of the two A/D-converters in the storage regions 711, 712 reserved for this purpose. The reference pulse and/or antenna ringing may fall within dynamic range II.

If, in the HF-circuit, low amplification is preset by way of the HF-switchover device 703, the rather small echoes from the dynamic range 1701 are assigned to the two groups IF11 and IF21 by way of the two A/D-converters 140a, 140b in the storage regions 711a, 712a reserved for this purpose. The useful echo may fall within dynamic range I.

The echo curves shown in FIG. 9 are used to clarify the signals in FIG. 8, wherein for the purpose of simplifying the illustration only the envelopes of the IF-signals described in FIG. 8 are shown. This simplified representation thus does not show the IF-signals of the channels 831, 830, but instead their representation as an envelope. In contrast to this the circuit according to FIG. 8 processes the IF-signals, whose envelopes are reflected by the envelopes of FIG. 9.

In this arrangement FIG. 9*a* shows the three different IF-signals plotted on a common location axis or time axis corresponding to the distance between the particular reflection and the sensor. In contrast to this, due to its short transit time, the internally generated reference pulse 601 shows the shortest distance.

Thus, FIG. 9*a* shows three signals 601, 602, 602', which are essentially available in parallel, over a common time axis. The signals 601, 602, 602' begin at 0 m and end at the latest after 80 m. However, a signal that does not generate interesting curves in the entire range 0 m . . . 80 m can, in part, also be investigated at a shorter interval and can thus be cancelled earlier. As far as the reference pulse 601 is concerned, the signal form can, for example, be uninteresting after a distance of 3 . . . 5 m. As far as range II of the large signals 602 is concerned, it is possible that, for example, only the range up to 10 m is of interest, because behind this no large signals or large echoes 603 are usually expected. Cancelling the evaluation of the signals can be influenced by correspondingly controlling the switches 703, 704.

Both range I and range II are present at the same output 831 of the HF-module, while the reference pulse is present at the output 830.

The reference pulse 601 can be sampled by the two A/D-converters 140*a*, 140*b*, when the switch 704 or IF-changeover switch 704 is switched to the amplifier 705. The amplification, which in this arrangement is set by way of the HF-switchover device 703 or HF-module-switchover device 703, is essentially not relevant to the reference pulse 601, because, for example, the reference pulse 601 does not pass through the switchable transmitting and receiving amplifiers (not shown in FIG. 8) of the HF-circuit 110, 710, but instead internally travels a separate path from the transmission pulse generator 111 to the reference pulse IF-output. It is also possible on this path to provide a separate sampler (not shown in FIG. 8) for the reference pulse.

The reference pulse 601 has traveled directly, i.e. without being reflected from the feed material surface, to the module output 830 of the HF-module 710. Thus in the case of the reference pulse there is no differentiation between two dynamic ranges.

After reflection from the feed material surface the receiving signal 602 has reached the HF-module-output 117 by way of the directional coupler 112 and the amplifier 114.

If the IF-switch 704 is switched to the output of the amplifier 706, and at the same time the HF-switchover device 703 is switched to low amplification, the IF-signals can be sampled from the dynamic range II 702. These large echo signals, i.e. echo signals of a large amplitude, are shown in FIG. 9*a* with the solid line 602.

In the range of short echo distances it is also possible for large reflection amplitudes or large signals of echoes 603 to arise, which can still be processed without distortion in the dynamic range II. The present example assumes a dynamic range at the IF-output of the HF-circuit 710 of 90 dB. This means that in range II, signals, in particular echo signals, are still detectable that are 90 dB smaller than large echoes whose amplitudes are just at the limit where they are not yet distorted or limited. The dynamic range I and the dynamic range II comprise 90 dB.

Since the reference pulse 601 reaches the channel 830 by way of a separate channel, the different dynamic ranges I, II 701, 702 only affect the IF-channel 831, but not the reference pulse channel 830.

In order to be able to detect even smaller echoes, for example, echo 608, which are situated outside the dynamic range II, the HF-switchover device 703 can switch over to high amplification. In FIG. 9*a* the corresponding envelope signal is shown as a dashed curve 602' in dynamic range I. Large echoes 603 are limited as far as their amplitude is concerned, but the smallest echoes, such as echo 608, can still be detected in this range. In other words, as a result of the additionally connected amplification in the HF-module 710, large echoes, such as echo 603, are pushed beyond dynamic range I and are cut off, and consequently curve 602' arises.

The shown combination of the two dynamic ranges I and II, each comprising 90 dB, thus makes it possible for the sensor to process a total of, for example, 110 dB overall dynamics. The HF-changeover switch 703 connects additional amplification of 20 dB, which in FIG. 9*a* is shown by a shift in the lower limit of the dynamic range I under the lower limit of the dynamic range II. To this effect the envelopes 602 and 602' can, for example, be combined to form a single curve in that depending on the distance and on the amplitude the envelope values are selected from the range which happens to be better suited.

In the overlap area of both envelopes 602, 602' the average, possibly weighted, from both ranges can be used. In the overlap area the values should agree, except for an amplification difference (e.g. 20 dB) from the two ranges. With the use of the weighted average from both ranges slight differences or some other error influences that may occur can be compensated for.

FIG. 9*b* shows an example of a time sequence of the signals shown in FIG. 9*a*. FIG. 9*b* shows the way in which as a result of time-related switchover of the IF-switch 704 and the HF-switchover device 703 in the HF module 710 the different dynamic ranges I, II are treated sequentially. Since the echo curve 602, 602' is a periodically recurring signal, the different signals 602', 602 of the different dynamic ranges can be evaluated separately from each other in time. The length of the range to be investigated can be controlled by way of the switching duration of the corresponding switches. The signal 602' is shown at a distance range of 0 in to 80 m. In contrast to this, the signal 602 is shown in the distance range of 0 m to 10 m. It is also possible to show the curve 602 to 80 m and to evaluate it in the signal processing device, but in this example the range between 10 m and 70 m or between 10 m and 80 m was not taken into consideration because in those ranges only those echoes are expected whose amplitude does not exceed that of range I. In a dead range, e.g. in range II between 10 m and 80 m, there is no need to generate and sample the echo signal, which results in energy savings.

Below, the sequence of the signals shown in FIG. 9*b* is explained. The signal form starts in time with the reference pulse 601. When the falling slope of the reference pulse appears, the switchover device 704 switches over from channel 830 to channel 831. This switchover is shown by an ideal jump. At the time of switchover the signal 602' is already present on channel 830. Consequently, switchover takes place within the signal 602' approximately in the middle of the large pulse 603 as shown in FIG. 9*a*. In other words, from the switchover the signal form shown in FIG. 9*b* follows the corresponding form of curve 602'. This means that from the reference pulse 601, i.e. after reference pulse 601, switchover to the signal from range I takes place by means of the switch 704. As shown in FIG. 9*a*, at this point in time part of the first, large echo 603 from range I is already past.

While keeping the switch position of switch 704 unchanged, after a duration that corresponds to the distance of 80 m, changeover to range II takes place. This switchover can, for example, take place by means of the HF-module switchover device 703 or HF-module range switchover-device 703. The echo signal that is then present is investigated in a shorter range II, for example from 0 m to 10 m. Since the ranges I and II are based on the same periodic echo signal, the signal forms essentially agree, except for the different amplification. Therefore the signal forms 602', 602, in particular in the region of the notch of the large echoes 603, have a similar structure. Due to the periodicity of the echo curve the ranges I and II can be imaged sequentially. The various durations of the switchovers are designed so that they can be set depending on the application. After investigation of the signal in the dynamic range II, the curve of FIG. 9b can be periodically continued (not shown in FIG. 9b).

In other words, this means that the time axis or the distance axis for the echoes starts near the value zero with the reference pulse 601. Shortly after the maximum of the reference pulse 601, the IF-switch 704 is switched over to the amplifier 706, which, when high amplification (dynamic range I) is switched on within the HF-circuit 710, provides echoes 603 from the measuring path with high amplitude, which echoes at the time of switchover can just be very close to 0 m. In this arrangement the amplitude of the near echoes can be limited as a result of the high amplification, or the amplitude can be cut off. While in range I the weak and remote echoes are to be accentuated, the near echoes are nevertheless imaged even if they are amplified to the very limit.

Subsequently, while the dynamic range I is still active, essentially all the reflections from the measuring path up to an interesting maximum distance are received; in the example of FIG. 9b up to a distance of 80 m. Due to the high amplification of the dynamic range I even small echoes 608 become visible. In FIG. 9b the echo widths are not shown to scale in relation to the indicated measuring range of 80 m.

Subsequently, i.e. after switching the switch 703 over, the amplification is reduced by means of the HF-switchover device 703, and the echo curve from range II is then sampled starting with the distance 0 m. The amplitude of large echoes 603 is essentially not distorted in dynamic range II. As indicated in FIG. 9b, it may be sufficient to record this essentially non-amplified signal only to a distance of approximately 10 m. In a possibly subsequent dead region it is, for example, possible to save energy or to carry out some other task.

It can be assumed that the amplitude of echoes situated at a distance greater than 10 m even in an ideal case does not become large enough to reach the limit in range I.

In order to be able to process 90 dB dynamics of a region, the two A/D-converters 140a, 140b should, for example, have 18 bit amplitude resolution. If converters of lesser resolution are used, there is a reduction in the dynamics of the two regions I, II that can be processed by the A/D-converters. Correspondingly equally high dynamics can then be achieved by a greater amplification difference between the two ranges I, II and thus by less overlap.

If the IF-echo signals of the HF-circuit have less overall dynamics, then a switchover device of the two ranges I, II can be switched off because it is then superfluous.

The digitised sampling values IF12, IF11, IF12, IF22 of the IF-signal 117 form the database for the functional block, shown in FIG. 7, of digital echo-signal processing 151, which follows on from the A/D-conversion and possibly from the storage process.

The next-following part of digital echo-signal processing 151 comprises signal pre-processing 201, which by means of suitable arithmetic operations prepares or manipulates the existing database, e.g. from the storage device 711, 711a, 712, 712a, or the storage device 521, 522, 523, 524, so that it is present in a form that is suitable for subsequent measured-value determination 204.

The two groups of digital values, of which the groups IF11 521, 711a and IF21 522, 712a, for example, represent small echoes, and the groups IF12 523, 711 and IF22 524, 712 represent large echoes corresponding to a ratio of v1>v2, to this effect are for example, if required, digitally filtered in groups (FIR Finite Impulse Response; IIR Infinite Impulse Response) 576a, 576b, 577a, 577b and are coherently averaged 578a, 578b, 579a, 579b.

The term "averaging" refers to averaging over sampling values of various sequential IF-signals of the same group, wherein the sampling values correspond to the same echo transit time. If averaging is carried out prior to the formation of the envelope, this is referred to as "coherent averaging" or "predetection integration"; while averaging the envelope values is referred to as "incoherent averaging" or "postdetection integration". Although both averaging methods essentially suppress noise relative to the echo signal, coherent averaging can in this respect be considerably more effective. According to the method described, coherent averaging may be applied simply by separate averaging of the different sampling groups. Compared to incoherent averaging, which can, of course, be carried out as an alternative or in addition with the calculated envelope values, the computing effort is only doubled. In the method of coherent averaging, averaging is carried out over all the sampling points of sampling in pairs. Because from precisely two sampling points precisely one envelope point can be calculated, the number of sampling points is precisely double the number of envelope points. Thus the computing effort of coherent averaging is twice that of incoherent averaging.

The term "small echoes" may denote that the amplitude of the envelope of the IF may be low. In any case, filtering and/or averaging suggests itself to the groups of small echoes 512 because in those groups echoes can be partly covered up by noise. Thereafter, pairs 571a, 571b, 500, 501 are formed from the sampled IF values from which the envelope values 572a, 572b, 503 are calculated.

After incoherent averaging 580a, 580b when required, the two separate envelopes (HK) for large echoes HK $2_N$ 572b and for small echoes HK $1_N$ 572a are combined to faun a total envelope 581. This merely requires knowledge of the amplification difference between v1 and v2 and a certain overlap of the two dynamic ranges of the channels 512, 511. In other words, the method described in FIGS. 9a and 9b can quasi be used in the reverse direction. As a result of this division into small 511 and large 512 echoes it is possible to save costs because components such as the A/D-converters 140a, 140b can be used that do not have to cover the entire dynamic range of all the possibly occurring signals.

A further part of signal pre-processing 201, which part is not shown in FIG. 7, may relate to subtraction of one-off spurious echoes, for example during measuring of the container, or spurious echoes that were stored following user input. The spurious echoes that were stored on the basis of the envelope values or of the IF-values, which spurious echoes represent the reflection conditions in a partly or fully empty feed material container, are subtracted from the actually sampled or calculated values in order to rid the actual-echo curve of the interfering influences of reflections that do not originate from the feed material.

This subtraction can be carried out on the basis of the IF-values to be digitised, wherein very accurate results may be achieved. For this calculation at IF-level, both the actual-echo curves and the spurious-echo curves are stored as sampled IF-values. In this way it may be possible to do without considering the envelope.

During subtraction of the actual-echo curve and the spurious-echo curve on the basis of the envelope values it can happen that in echoes that partly overlap this overlap can reveal itself differently, depending on the phase position of the two echoes relative to each other. The result could thus depend on a random phase position of the curves relative to each other. In phase synchronism the two components add up, while in phase opposition mutual subtraction takes place. Correspondingly, correction of an echo curve comprising two overlapping echoes may not be possible unless the phase of the underlying IF-curves is taken into account. However, when viewed at the envelope level, the phase position may essentially not be possible because as a result of the formation of the envelope only the amplitude information may still remain, but not the phase information of the original IF-signal.

The calculated total envelope 581, 582 forms the basis for useful-echo identification 202, which identifies the feed material echo or useful echo from the totality of all the echoes of a curve. The useful echo may be the echo that is generated by the feed material surface. Minor amplitude errors or rounding errors during envelope calculation 581 are to be tolerated without further ado, as is a reduction in the time resolution of this evaluation step.

In order to identify 202 or evaluate 202 the sought echo, i.e. to determine the position of an echo within the echo curve, for example the processing steps described below can be used.

First, from the totality of the IF-signal, or from the echo curve, individual echoes are separated and characterised as far as their features are concerned. Detection of the echoes is, for example, based on a threshold value curve that has either been predefined for the device or is dynamically generated during operation. As far as their amplitude is concerned, the stored envelope values are compared to the time-dependent threshold. Envelope values that are above the threshold indicate an echo at this point or at this position. In order to detect only the relatively largest echoes of an IF-signal it is possible to lower the threshold step by step until a sufficient number of echoes have been detected.

Detected echoes are characterised by their features, for example maximum amplitude, signal-to-noise ratio, echo length, echo shape, average value, focal point and slope steepness. These characteristics may make it possible to determine the shape of the echo under investigation. From the echo characteristics it is also possible to some extent to draw conclusions concerning the type of container, the nature of the feed material surface and the ambient conditions. Furthermore, from the mutual echo distances it is possible to derive certain reflection conditions within the container, for example inclined bulk material surfaces or multiply-reflecting curved container ceilings. This information may contribute to the selection of application-related software parameters for improved processing of the sampled echo values, and also provide users not only with pure filling level information but also with further-reaching pointers to the ambient conditions in the container, the functional reliability of the sensor and measuring in general.

From the totality of the echoes of an IF-signal, finally by means of all the collected characteristics the echo of the feed material surface is identified, i.e. the useful echo is identified.

Identification of the reference echo may be easier than identification of the useful echo, because the reference echo relative to commencement of measuring appears essentially always at the same position, and as the echo with the shortest transit time can essentially not be affected by interference resulting from reflections from the container.

The second part of measured-value determination concerns echo measuring 203. Echo measuring 203 uses the results of useful-echo identification 202 but can be carried out in parallel to useful-echo identification.

In order to arrive at a measured value 591 for the filling level, the interval between the reference echo and the identified feed material echo is determined 592. Such measuring 592 is firstly based on the digital envelope values 593 of both echoes (the large and the small echoes). Consequently it is not the sampled IF-values that are investigated. However, since these can contain small calculation errors, for a limited number of envelope points a further method for more precise calculation of the envelope points can be applied. Instead of calculating the respective envelope points 598, it is possible, for example, to calculate more accurately those points of the envelope—all the points of the envelope of the reference echo and of the useful echo—in the time range of the two echoes to be measured, i.e. of the reference echo and/or of the useful echo, directly from the sampling pairs 571a, 571b, 593 of the IF-curve. The information about their position in time is transferred, within echo measuring 203, from the block for useful-echo identification 202 to the block for correction of the envelope values 594. In relation to the same points it is also possible to carry out calculation of the phase 595 in order to further improve measuring accuracy. As far as the modality of incorporating phase values to improve measuring accuracy is concerned, reference is made to DE 44 07 369.

The functional blocks 202, 203, 581, 594, 595 and 592 can be tasks or devices that carry out the tasks.

When measuring the echo distance 592 between the reference echo and the useful echo on the basis of the envelope values, the distance between the respective maximums of the reference echo 560 and of the useful echo 561 may describe the echo distance only very inaccurately. Therefore, in one example, measuring between two points on the echo slopes may be used, whose amplitude is in a defined ratio to the respective maximum amplitude of the echo. In a further example intermediate points to the determined envelope points in the region of the echo slopes to be measured can be interpolated. The determined envelope points are calculated from a sampling pair each, at a distance of ta1, as shown in FIG. 5. For interpolation of the intermediate points, interpolation methods, such as for example linear interpolation, polynomial interpolation or spline interpolation, may be used.

As an alternative to this there are also methods in which the position of an echo is determined in that a previously defined standard echo or a section of such a standard echo is made to mathematically coincide in the best-possible manner with the points of the echo actually to be measured. A standard echo is a reflection from an ideal reflector, e.g. a liquid surface, while the standard echo or spurious echo is determined without the presence of a liquid.

From the position of the standard echo, which position has been determined by making the standard echo coincide, the sought position in time of the actual echo results. Methods for correlating the IF-curve or the envelope with this standard echo aim to achieve the same result. For example, correlation at the IF-level is carried out. At the point in time at which the correlation result is at its maximum, the standard echo best fits the corresponding curve, and therefore this point in time at the same time also represents the position in time of the echo.

Subtraction at the IF-level of the measured echo and of a spurious-echo curve can also support determination of the distance of the reference echo 560 and of the useful echo 561.

After measuring 592, for each measurement cycle a measured value 596 arises in relation to the distance between the feed material echo 561 or useful echo 561 and the reference echo 560. When the determined sensor parameters and container parameters are known, this measured value 596 can be converted to a filling height.

Finally, measuring accuracy may be able to be improved in that such measured values 596 of various successive measurement cycles are averaged 597. The time constant of averaging can be set so as to be fixed when averaging or it can be dynamically adapted. If newly determined measured values differ only slight from the previously determined measured value, the time constant is increased to a certain extent. However, if several new measured values in sequence differ from it, this indicates movement in the feed material, and the time constant should be reduced. Likewise, in certain cases it is useful to provide a hysteresis for outputting measured values. This is justified when it has to be assumed that the movement direction of the feed material surface reverses only rarely, and that for such a case a slight delay in the output measured values is accepted. The measured value 591 determined in this manner is finally the value that is output, in analogue and/or digital form, by the sensor as a filling level.

It has thus been shown by sampling a few values of the IF-signal that an envelope and/or a phase angle of the IF-signal can be calculated in each case from only two sampling points. It is thus possible to reduce the requirements for storage space 152 and computing time for digitisation and evaluation of the IF-signal 117, without having to do without the advantages that may be provided by predominantly digital signal processing. Digital signal processing makes it possible, for example, to be free of component tolerances, to easily adapt processing to various sensor parameters, to increase the signal-to-noise ratio by means of digital filtering and coherent or incoherent averaging, and to improve measuring accuracy by evaluating the phase or the phase information.

Furthermore, there is the option of adapting the sampling frequency to various sensor types and to various power supplies of sensors. In two-conductor sensors with an analogue measured-value output in the form of current of between 4 and 20 mA being taken up, the power available to the sensor is relatively small. This can be counteracted by adjusting the sampling frequency. It may even be possible to vary the sampling frequency within an IF-curve, e.g. in order to sample the regions of interest of the reference echo and of the feed material echo more finely than the remaining regions without the echoes to be measured.

Digital echo signal processing with the components of signal pre-processing 201 and measured-value determination 204 can be serially processed, wherein measured-value determination is again divided into the functional blocks of useful-echo identification 202 and echo measuring 203. After digitisation by means of signal pre-processing 201, the analogue echo curve 117 provided by the hardware becomes a digital echo curve 582. The digital echo curve 582 is transferred to the functional block useful-echo identification, and is analysed by the functional block useful-echo identification as far as the position of the useful echo is concerned. Finally, this position, for example in the form of a distance range, is transferred to the functional block echo measuring 203, which within the transferred region carries out precise measuring of the useful echo. The transferred region or the analysed position can be an approximate position of the echo.

However, the serial sequence can also be broken up in order to, by parallel processing or by interleaved processing of the functional block useful-echo identification and of the functional block echo measuring, achieve not only detailed, thorough and elaborate useful-echo identification, but also fast updating of the measured value. The functional block useful-echo identification may identify a useful echo, and the functional block echo measuring may measure an echo. In other words, the functional block useful-echo identification carries out the task of useful-echo identification 202, and the functional block echo measuring may carry out the task of echo measuring 203.

Parallel useful-echo identification 202 and measuring of the echoes 203 make it possible for the measuring task 203 to essentially only have to process a selection of IF-curve values. In other words the number of parameters or values to be processed by the measuring task 203 is reduced for the entire echo curve when compared to the number of IF-curve values.

Figure 10:
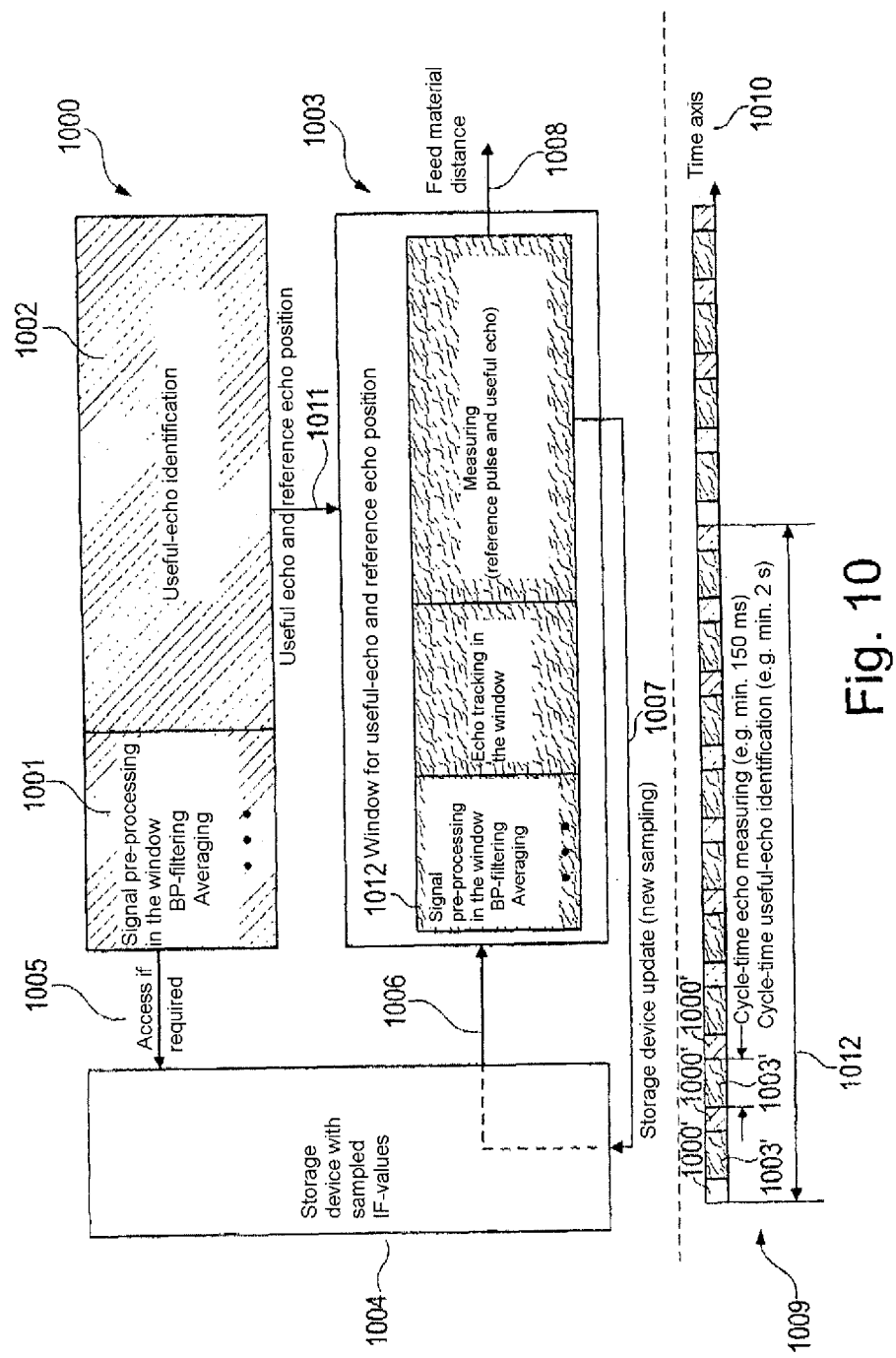
FIG. 10 shows a block diagram for a measuring device for parallel evaluation and measuring of echoes, according to an exemplary embodiment of the present invention.

FIG. 10 shows a block diagram for a measuring device for digital echo-signal processing for parallel evaluation and measuring of echoes, according to an exemplary embodiment of the present invention.

The block diagram of FIG. 10 shows two tasks 1000, 1003 or two functional blocks 1000, 1003 which access a shared storage device 1004. In the storage device 1004 the sampled IF-values are stored. In particular, in the storage device 1004 the IF-values that have been sampled in pairs are stored. If required, the task 1000 for useful-echo identification of an echo curve accesses the shared storage device 1004 by way of the storage connection 1005. The evaluation task 1000 can, for example, be implemented on an integrated switching circuit with a dedicated or a shared processor, and then implements an evaluation device 1000 of an analysis device.

The evaluation task 1000 comprises the functional block signal pre-processing 1001, which, for example, comprises bandpass filtering and averaging the sampled IF-values taken over from the storage device 1004. Furthermore, the functional block useful-echo identification 1002 designates the device for determining the echo positions both of the useful echo and of the reference echo. Evaluation 1000 does not comprise measured value determination, i.e. determining the measured value of the filling level height takes place in a separate functional block 1003. Useful-echo identification 1002 determines, for example, the approximate position of the useful echo position and/or reference echo position. The associated positions can also be regions that may be referred to as corresponding windows. The determined regions for the position of an echo are made available, by the evaluation task 1000, to the second task 1003 or to the echo measurement task 1003 by way of the connection 1011. The connection 1011 can be a communication connection between two processes, a communication relationship or a line, by way of which the two switching circuits 1000, 1003 can communicate with each other. The switching circuits 1000, 1003 may fulfil the functions of evaluating and measuring the echo curve. Thus, in each case the measurement task 1003 is given a window or a window region for the useful echo position and/or the reference echo position. The values within these windows can be processed by the echo measuring task 1003 within signal pre-processing 1012.

Signal pre-processing 1012 for the further processing of the echo curve within the window can also involve bandpass filtering and/or averaging or other pre-processing functions. Furthermore, for more accurate position determination echo tracking over several echo curves can be carried out within the window. By means of echo tracking, which is limited to the relatively short distance range of a window, a useful echo or reference echo that moves within the window can be tracked so that the subsequent echo measuring process receives information as to the position within the window at which position the respective echo is to be measured.

Finally, measuring the reference pulse and/or the useful echo also takes place within the predetermined window region. Both for the reference pulse and for the useful echo a separate window can be generated. However, the reference pulse and the useful echo can also be kept within a shared window. During measuring of the reference pulse and/or of the useful echo, detailed evaluation can take place because in relation to the extent of an echo curve or of an echo profile it is only a section of the echo curve or of the echo profile—and thus from the totality of all the sampled IF-values of an echo curve, it is only a fraction of these values—that need to be considered. This section comprises the sub-region of the echo curve, which sub-region is predetermined by the region boundaries of the window.

Thus, expressed in other words, the evaluation task 1000 or the evaluation device 1000 controls an evaluation region or a window in such a way, by way of the echo curve, that in all probability the useful echo and/or the reference echo or some other echo of interest comes to be positioned within the window. Since the position of the window changes only very slowly, a low measuring rate or repeat rate can be used for the evaluation task. In other words this is to say that processing of the task for evaluation, i.e. the task for sliding the window over the echo function, takes place at longer intervals than does detailed determination or measuring the echo within this window region. The echoes are investigated within the window in order to determine the position of the actual echoes as accurately as possible. From these positions the distance between echoes can be determined, wherein the distance can be converted to a filling level.

When measuring by the measurement task 1003 or by means of the measurement device 1003 that carries out the measurement task, it is also possible to use computing-intensive operations because the region across which these operations are carried out is limited to the window region.

Positioning the window over the echo curve and thus selecting a region of interest can essentially take place independently of the actual measuring of the echo. Thus, the evaluation device 1000 and the measurement device 1003 can act essentially independently of each other. The evaluation device 1000 and the measurement device 1003 form an analysis device. Only necessary information, for example positioning details relating to the window, or status information, is exchanged by way of the communication connection 1011. In one example the storage device 1004 can also be used for information exchange.

In order to evaluate the echo curve or the echo function the two tasks 1000, 1003 access the storage device 1004 with the sampled IF-values. Storage of the IF-values can mean a reduction in the data to be stored, because the IF-values can, for example, be sampled in pairs and possibly at larger intervals than predetermined by Nyquist's sampling criterion. Sampling in pairs can thus not only reduce the number of digitised data, but it can also accelerate post-processing.

In the storage device 1004 a digital representation of the echo curve or of the echo profile is stored. Both the evaluation device 1000 and the measurement device 1003 can access the storage device and thus the actually stored echo function by way of the access connections 1005, 1006. The IF-values make it possible, if a predeterminable small error is tolerated, to recover an envelope of the echo function from the IF-values of the IF-echo function. If required, for example after a time element has lapsed, by way of the storage update connection 1007, the measurement device 1003 can initiate new sampling or take-up of the echo function. A part of the sampled IF-values, which part is situated within the window, is read into the measurement device 1003 or measuring device 1003, and after completed measuring or echo position determination, a feed material distance is conveyed to a user or to a further-processing device (not shown in FIG. 10) by way of the output connection 1008. By separating and parallel-processing echo measuring in block 1003 from the useful-echo identification in block 1000, the sensor measuring rate can be increased:

Increasing the sensor measuring rate is explained in the time diagram 1009 that forms part of the block diagram. The occupation of a shared processor by the evaluation device 1000 and by the measurement device 1003 is shown along the time axis 1010. In each case the evaluation device 1000 occupies the shared processor during time slices (an interval on the timeline 1010), which time slices are designated 1000'. An evaluation cycle comprises, for example, a cycle time of at least two seconds. In other words, the time that the evaluation device 1000 requires to track the window can be in the order of 2 seconds. In other words, after a duration of 2 seconds the evaluation device 1000 provides a new window position for evaluation of the useful echo and/or reference echo. However, during the cycle time of evaluation the position of the window remains constant.

The task of evaluation 1012 is divided into many small subordinate time slices 1000' in order to make it possible for the evaluation task to be interrupted by measurement tasks 1003'. Only after expiry of the cycle time for useful-echo identification is a useful-echo identification task 1012 complete. In contrast to the evaluation task 1012, the measurement tasks 1003' in each case designate completed measurement cycles. At the end of each measurement cycle 1003' a new measured value results. For example, a measurement cycle can be at least 150 ms. In relation to the interleaved processing, shown in FIG. 10, of the two software blocks or tasks 1000, 1003 or of the evaluation device 1000 and the measurement device 1003, during an evaluation cycle of 2 seconds 9 measurements 1003' can be carried out before the window is moved to a new position.

The interleaved processing according to the time diagram 1009 is a periodic operation; in other words, after completion of an evaluation cycle time 1012 or of a useful-echo identification cycle time 1012 a new evaluation cycle time follows. The ratio of percentage distribution of the processing times of the two tasks 1012, 1003', or the pulse duty ratio, can be adjustable. Corresponding to the number of interruptions, the cycle time 1012 for evaluation can be lengthened or shortened. In contrast to full processing, the measurement task can also be divided into several subordinate time slices.

Figure 11:
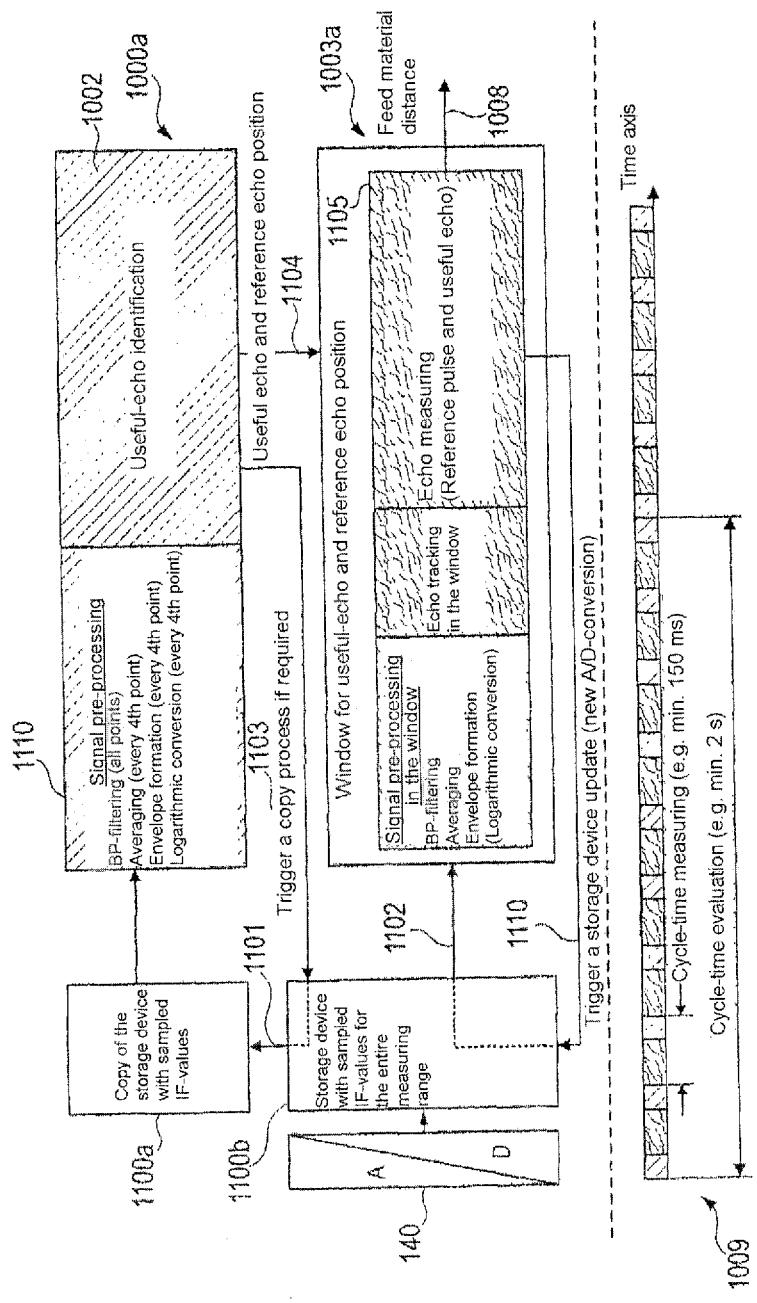
FIG. 11 shows a further block diagram for parallel evaluation and measuring of echoes, according to an exemplary embodiment of the present invention.

FIG. 11 shows a further block diagram for parallel evaluating and measuring echoes, according to an exemplary embodiment of the present invention.

The block diagram designated variant A comprises the evaluation device 1000a and echo measuring 1105. The evaluation device 1000a or evaluation task 1000a not only comprises the useful-echo identification device 1002 but also signal pre-processing 1110. Signal pre-processing 1110 involves bandpass filtering, averaging, envelope forming and logarithmic conversion. Determining the measured value does not form part of the evaluation task.

With all the points, in other words with all the IF-sampling values, bandpass filtering (FIR or IIR) should be carried out separately according to groups, as described in FIG. 7, while for averaging envelope formation and logarithmic conversion the number of points can be reduced. For example, these operations can be carried out only at every 4th point, in other words for every 4th sampling point or for every 4th pair of sampling points.

It is not necessary to evaluate every sampling point or every sampling value, because for useful-echo identification 1002 a coarser time resolution of the echo curve is quite acceptable. In an echo curve that is of coarser time resolution and amplitude resolution, echoes can essentially be detected just as well and can be investigated with a view to a useful-echo decision as is the case with the use of all the points available in the storage device. However, in addition, the reduction in the number of points advantageously results in savings in computing time.

According to the embodiment of FIG. 11, the storage device with sampled IF-values 1004, in FIG. 10 shown as a shared storage device, is divided into an evaluation storage device 1100*a* and a measurement storage device 1100*b*. The evaluation storage device 1100*a* comprises a copy of the measurement storage device with sampled IF-values. The measurement storage device 1100*b* is a storage device with sampled IF-values for the entire measuring range of the echo curve.

By way of the storage communication connection 1101*a* copy of the sampling values is provided to the evaluation storage device 1100*a* for the evaluation function 1000*a*. In this process the function useful-echo identification 1002, by way of the trigger connection 1103, triggers a process of copying the IF-values. The storage device with the sampled IF-values 1100*b* is supplied with corresponding IF-values by way of the A/D-converter 240. The measurement device 1003*a* can access the stored IF-values by way of the storage connection 1102. By means of the values received from the storage device, the measurement device 1003*a* can carry out signal pre-processing within the window. In other words, this signal pre-processing, for example bandpass filtering, averaging, envelope forming and if necessary logarithmic conversion, can be limited to the window predetermined by the evaluation task 1000*a*. Correspondingly, in one example only the storage values of the entire measuring range, which storage values fall within the window region, are transmitted by way of the storage connection 1102.

In contrast to signal pre-processing within the evaluation task 1000*a*, in signal pre-processing of the measurement device 1003*a* all the available sampling points within the window are processed. In this part there is no data reduction by doing away with part of the points, and therefore there is no coarser time resolution, because in this arrangement all the echo points can contribute to accurate measuring of the echo position.

After evaluation of the window region, triggering a device update can be initiated by the measurement device 1003 by way of the trigger connection 1110. After a storage device update has been triggered, by way of the A/D-converter 140 new A/D-converted values of a corresponding echo function or echo curve are stored in the storage device 1100*b*. Division of the process calculation time takes place, in the same manner as in FIG. 10, according to the processor allocation plan 1009 or schedule 1009 as interleaved processing by means of the evaluation function or evaluation device 1000*a* and the measuring function 1003*a* or measurement device 1003*a*.

The term "measuring function" or "evaluation function" may refer to a function or software for controlling an evaluation device 1000*a* or a measurement device 1003*a*.

In variant A of a measuring sensor, shown in FIG. 11, which measuring sensor is based on separation and parallel processing of echo measuring, the sampling or A/D-conversion is triggered by software block measuring 1105 on the measurement device 1003*a*. In variant A a copy of the IF-sampling values is used for useful-echo identification.

IF-averaging within the window or window region can be carried out more quickly than is the case over the entire measuring range of the echo function or over the entire echo curve. A copy of the sampling values provides the echo database for the evaluation function 1002. The copy of the sampling values is stored in the storage device 1100*a* that is assigned to the evaluation device 1000*a*.

Figure 12:
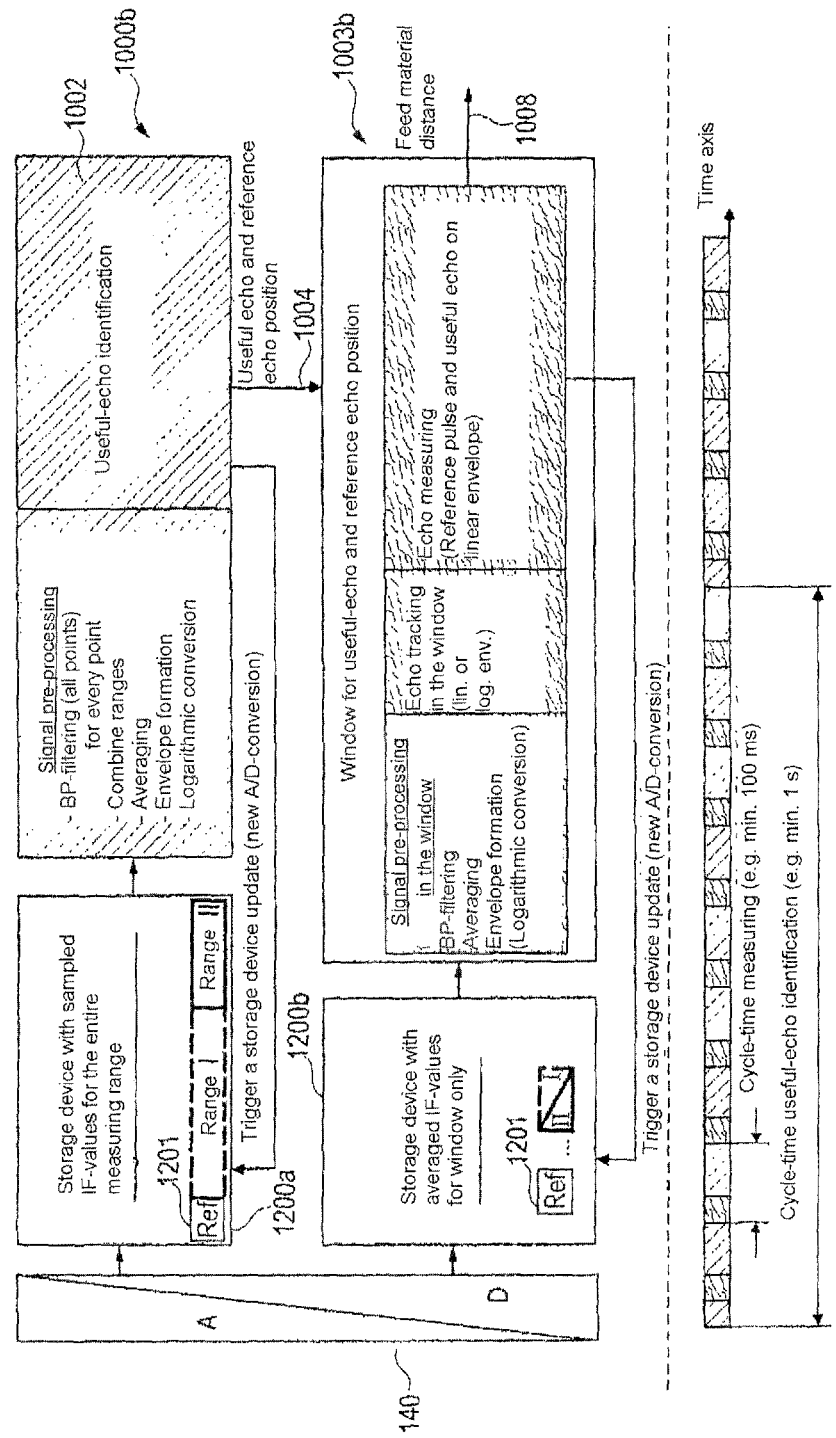
FIG. 12 shows a block diagram for parallel evaluation and measuring of echoes with separate storage regions for parallel processing of echo measuring, according to an exemplary embodiment of the present invention.
Figure 14:
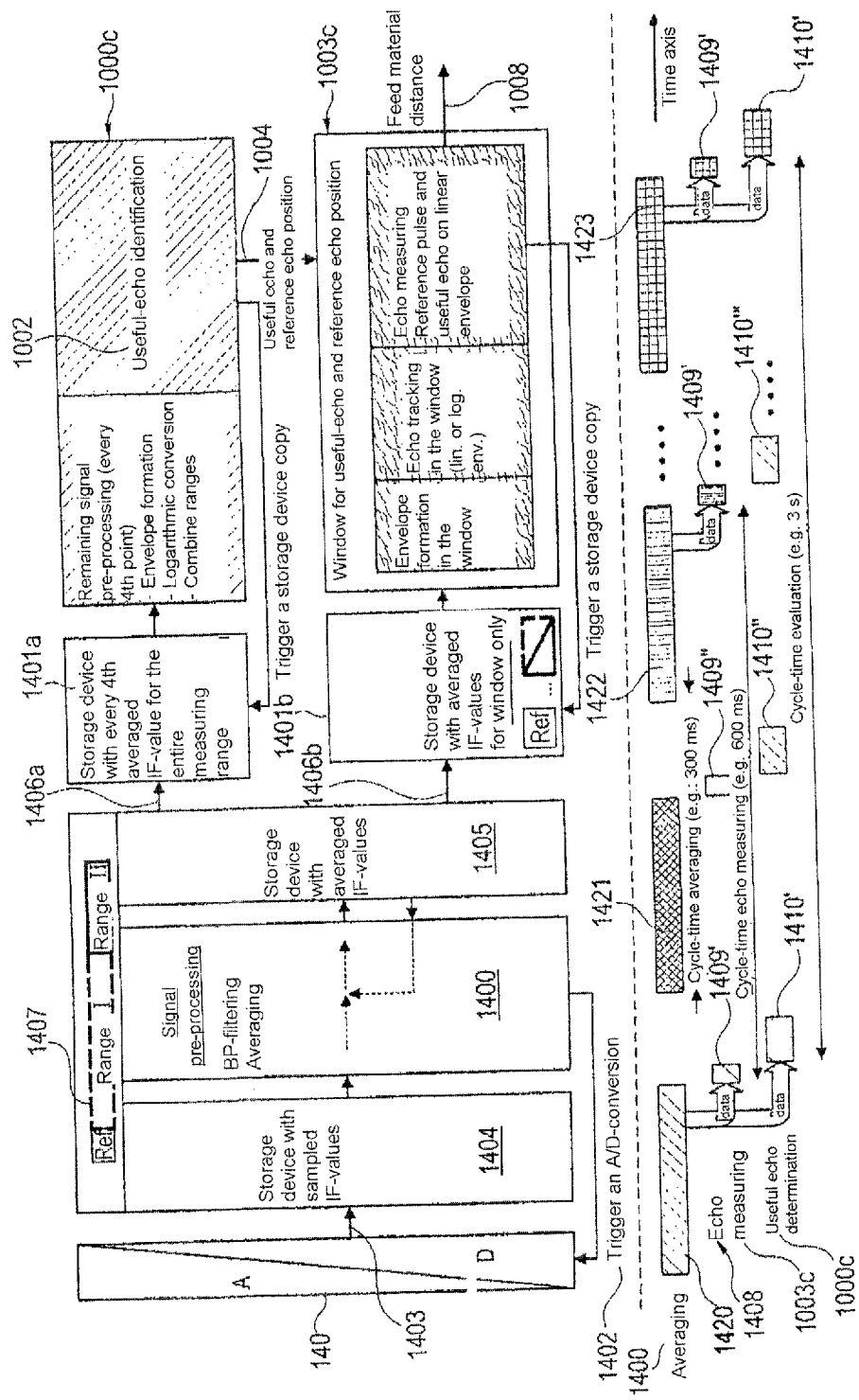
FIG. 14 shows a block diagram for parallel evaluation and measuring of echoes with upstream averaging as a dedicated task, according to an exemplary embodiment of the present invention.

Determining the feed material distance can take place at a high measuring rate. The rate of the echo profile evaluation or useful-echo position can be a medium rate. By averaging with a high averaging factor, i.e. the average is calculated from many sampling values, high signal sensitivity for the window region can be achieved. In contrast to this, the gain in signal sensitivity over the entire measuring range is less pronounced because averaging that forms part of the evaluation task 1000*a* is not carried out as frequently, and therefore the averaging factor has to be correspondingly lower. The ratio of measuring rate to power consumption is balanced when compared to that of variants B and C (FIG. 12 or 14). As a result of the copy of the IF-values in the storage device 1100*b*, there is an increased requirement for storage space.

FIG. 12 shows a block diagram for parallel evaluation and measuring of echoes with separate storage regions for parallel processing of echo measuring, according to an exemplary embodiment of the present invention.

Variant B of a measuring sensor, which variant is shown in FIG. 12, comprises separate storage and separate processing as well as two HF-module sensitivity ranges or dynamic ranges I, II. With variant B, too, by means of separation and parallel processing of echo measuring, the sensor measuring rate can be improved.

The evaluation device 1000*b* is directly connected to a storage device 1200*a*. The measurement device 1003*b* is directly connected to a storage device 1200*b* that is assigned to it. The evaluation storage device 1200*a* and the measurement storage device 1200*b* are fed in parallel, as required, by the A/D-converter 140. According to the schematic diagram 1201, the storage device 1200*a* is divided into three ranges. A first range is provided for the reference pulse; according to FIG. 8 a range I is provided for a dynamic range with rather small echoes; and a range II is provided for a dynamic range with rather large echoes. The evaluation storage device 1200*a* comprises sampled IF-values for the entire measuring range. In this arrangement the stored IF-values are stored according to the schematic diagram shown in FIGS. 9*a* and 9*b*. Triggering a storage device update, in other words a new A/D-conversion for the entire measuring range, is demanded by the useful-echo identification task 1002. Thereafter an image of a complete echo curve is kept in the evaluation storage device 1200*a*. The image can be divided into sensitivity regions.

Since the measurement device 1003*b* essentially is only interested in the detailed region or window region of the useful echo and/or of the reference echo, in the evaluation storage device 1200*b* storage of the sampled IF-values for these two windows only takes place. As an alternative, at least the IF-values that were determined in relation to these two windows can be stored. Such storage also takes place according to the schematic diagram 1201 that is explained in more detail in FIGS. 9*a* and 9*b*. However, in a manner that differs from this schematic diagram 1201, in the window region of the useful echo 1200*b* only one of the two dynamic ranges is sampled. By means of the information relating to the useful echo, which information was conveyed by the useful-echo identification 1002, a decision is made as to which of the two dynamic ranges is better suited to sampling the useful echo. The information conveyed also comprises amplitude information.

The measurement device 1003b can form a linear or logarithmic envelope and can carry out measuring of the reference pulse and/or of the useful echo on the linear or logarithmically converted envelope. Envelopes can be further processed in logarithmic form, e.g. hardware logarithmic conversion. For useful-echo identification 1002 it is also possible to continue to use logarithmic observation of the envelope. However, for echo measuring 1003b it is possible to do without logarithmic conversion, and in this way any errors in the formation of the logarithmic envelope value from the linear value can be prevented from occurring.

The measurement device 1003b can trigger a storage device update or a new A/D-conversion for the measurement storage device 1200b. Triggering the storage device update by the measurement device 1003b can take place independently of triggering the storage device update for the evaluation device 1000b. In one example, the evaluation device 1000b can trigger a storage update after completion of a cycle time of evaluation.

According to variant B from FIG. 12, the cycle time for evaluation or for useful-echo identification is, for example, at least 1 second, and the cycle time for measuring is, for example, at least 100 ms. Compared to variant A from FIG. 11, in variant B a still shorter cycle time (e.g. 100 ms) is achieved for echo measuring, because in this arrangement storing 1200b the IF-sampling values for echo measuring is limited to the regions of the window rather than to the entire measuring range, and for this reason storing can be completed more quickly. Consequently, proportionally more processing time can be allocated to useful-echo identification, so that here, too, the cycle time is shortened (e.g. from 2 s to 1 s).

Figure 13:
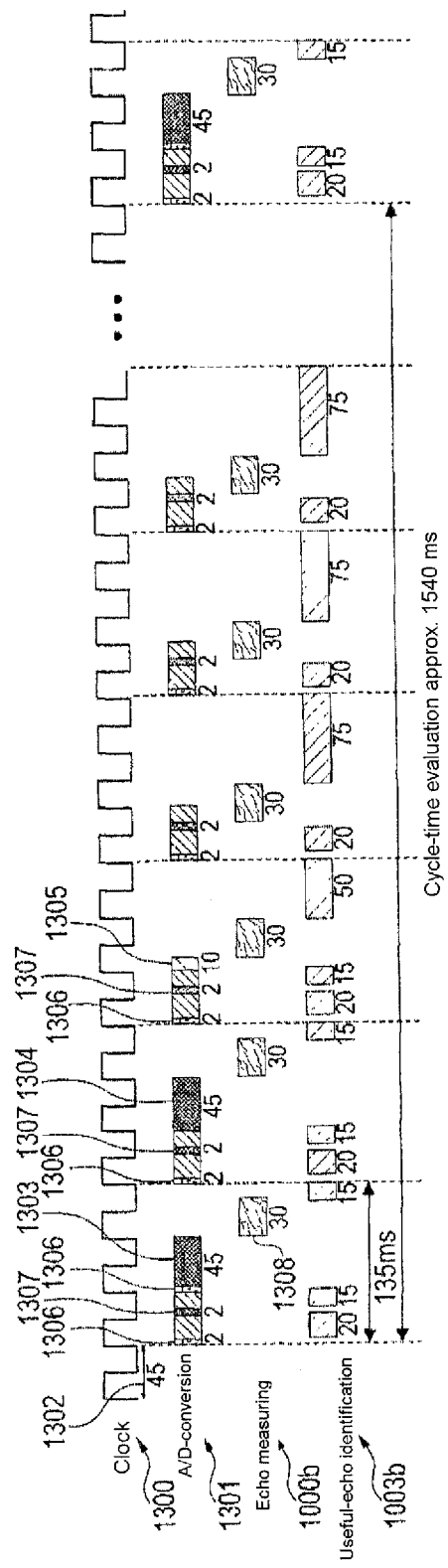
FIG. 13 shows a timing diagram for separate storage and processing for a measuring device of FIG. 12, according to an exemplary embodiment of the present invention.

FIG. 13 shows a more detailed timing diagram for separate storage and processing for a measuring device (variant B) shown by the block diagram of FIG. 12, according to an exemplary embodiment of the present invention.

The trigger, timing pulse or clock pulse 1300 is generated in the HF-part 110 of the sensor; it defines the timing pulse for the individual processing steps.

The lines below the clock 1300 show the activity of the individual tasks or devices. The first line shows the task of A/D-conversion 1301. Below it the sequence of the measurement task 1000b or activity period of the measurement device 1000b is shown, and below it the time diagram for the evaluation task 1003b or activity task of the evaluation device (useful-echo identification) 1003b is shown.

In the example shown, the cycle time of an evaluation cycle is 1540 ms. This is based on the assumption that the processing time for echo measuring is approx. 30 ms. The processing time for evaluation can be approx. 1000 ms for an 80 m measuring range. According to line 1003b of FIG. 13, the processing time of 1540 ms of the evaluation cycle (useful-echo identification) comprises time slices of the durations of 20 ms, 15 ms, 15 ms, 20 ms, 15 ms, 15 ms, 20 ms, 15 ms, 50 ms, 20 ms, 75 ms, 20 ms, 75 ms, 20 ms, 75 ms and further alternating time slices with 20 ms and 75 ms, which for the sake of improved clarity are not shown in further detail.

The duration or processing time for echo measuring is shown in line 1000b; every 135 ms it is 30 ms. This means that on average a new measured value 1308 is available every 135 ms.

Within a clock pulse an echo curve corresponding to a measuring distance range of 40 m can be generated in the HF-circuit, i.e. the reflections are processed only over a defined time range. In this arrangement the measuring distance within the clock period or trigger period can optionally rise from 0 m to 40 m or from 40 to 80 m. Likewise, the dynamic range is selectable between range I and range II. In this arrangement, cycle duration is approx. 45 ms. Thus in an alternating manner the distance range from 0 m . . . 40 m 1303 and the distance range from 40 m . . . 80 m 1304, can be digitised, both with dynamic range I. Furthermore, in approx. 10 ms a distance range from 0 . . . 10 m 1305 in the dynamic range II can be digitised. Thus, after digitising the three distance ranges 1303, 1304, 1305, the echo curve in the distance range from 0 m to 80 m in dynamic range I, and in the distance range 0 m to 10 m in the dynamic range II is digitised once, as shown in FIG. 9. These digital values are stored in the storage device 1200a according to the schematic diagram 1201 indicated in that location.

For a first duration 1306 of 2 ms digitisation of the reference pulse takes place, and for the second duration 1307 of 2 ms, digitisation of the useful echo in the respective window takes place. The duration for digitising the echoes in the respective windows 1306, 1307 is shorter than the duration for digitising 1303, 1304, 1305 the entire echo curve. The values digitised within the window with the durations 1306 and 1307 are stored in the storage device 1200b according to the schematic diagram 1201.

In other words, according to line 1301, which describes the time lapse of the A/D-conversion, A/D-conversion of the reference pulse (duration 2 ms), of the useful echo (duration 2 ms), of the reference pulse and of the distance range 0 . . . 40 m takes place in the dynamic range I. This is followed by A/D-conversion of the reference pulse (duration 2 ms), of the useful echo (duration 2 ms) and of the distance range 40-80 m, also in range I. This is followed by A/D-conversion of the reference pulse (duration 2 ms), of the useful echo (2 ms) and of the distance range 0-10 m in the dynamic range II. This is followed by a repetition of always the same sequence with A/D-conversion of the reference pulse and of the useful echo.

The data, converted during digitisation, within the defined window widths, in this example thus within 2 ms, which corresponds to approx. 2 m, is stored in the storage device 1200b and is used for echo measuring.

In contrast to the above, the ranges, sampled at commencement of the useful-echo identification cycle, from 0 m to 40 m 1303, from 40 m to 80 m 1304 and again from 0 in to 10 m 1305 are stored in the storage device 1200a; they provide the basis for combination to forming an echo curve from 0 m to 80 m with high overall dynamics.

Since the time slices of the three lines 1301, 1000b, 1003b are never active concurrently, its shows that the three processes 1301, 1000b, 1003b or the three tasks share a common processor. However, considered in isolation the three processes are independent of each other, even if they may regularly be placed in sleep mode.

Variant B comprises separate sampling (A/D-conversion) for measuring 1306, 1307 and evaluation 1303, 1304, 1305. Within the limited window region 1306, 1307, IF-averaging can be carried out more quickly than in the overall measuring range 1303, 1304, 1305. The echo database in the evaluation storage device 1200a comprises independent sampling values with separate averaging, which averaging is lower when compared to averaging of the values for echo measuring.

Variant B comprises a high measuring rate for the feed material distance. Useful-echo identification, in other words determination of the useful-echo position in the evaluation device, can nevertheless be carried out at an acceptable rate. Signal sensitivity for the entire measuring range can be increased by averaging. Signal sensitivity for the window region is very high as a result of still higher averaging. Furthermore, a good ratio of measuring rate to power consumption is achieved; in other words the power available to the sensor, which power is very low in some circumstances, is optimally used in relation to the measuring rate. With low sensor voltage, e.g. 12V, and low loop current, e.g. 4 mA, optimum use of power can result in a measuring rate of several readings per second.

The additional sampling values in the storage device 1200b are only used for the window region, and therefore only a very modest additional storage requirement is imposed by parallelisation. By means of variant B a very high measuring rate and high averaging factors for the measured values may be achievable, and consequently very high measuring accuracy may result. Variant B can thus be used for precise measurements at a high measuring rate.

FIG. 14 shows a block diagram for parallel evaluation and measuring of echoes with upstream averaging as a dedicated task, according to an exemplary embodiment of the present invention.

Variant C, shown in FIG. 14, of a measuring sensor comprises upstream averaging and two HF-module sensitivity ranges.

According to FIG. 14, not only are the evaluation device 1000c and the measurement device 1003c provided as separate parallel devices or tasks, but so is part of signal pre-processing. For example, bandpass filtering and averaging are provided as a dedicated averaging device 1400 and are thus no longer part of the evaluation device 1000c and of the measurement device 1003c. The evaluation device 1000c in turn comprises the remaining signal pre-processing, which takes place at every 4th point, in other words at every 4th sampling point in time. For example, signal pre-processing comprises envelope forming, logarithmic conversion and combining ranges as well as the actual evaluation function 1002. Again, the evaluation device 1000c is connected to the measurement device 1003c by way of the communication connection 1004.

The measurement device 1003c again receives the window, in particular the window position for useful-echo position determination and for reference echo position-determination; it comprises envelope forming within the window, possible echo tracking within the window with a linear or logarithmic envelope; and measuring the reference pulse and/or the useful echo on the linear envelope can also be carried out in the measurement device 1003c. In contrast to the logarithmic envelope, in the measurement device 1003c the linear envelope is used, i.e. an envelope that has not additionally been subjected to logarithmic conversion.

As in variant B, the evaluation device 1000c and the measurement device 1003c have separate dedicated storage devices 1401a and 1401b of their own assigned to them. Furthermore, the evaluation function (useful-echo identification) 1002 can trigger the admission of a storage copy to the storage device 1401a. The storage device 1401a again receives, for example, only every 4th pair of averaged IF-sampling values; in other words already at the time of triggering a storage copy, sampling values of the echo curve, which sampling values have been band filtered and averaged in groups, are read into the storage device 1401a in relation to the entire measuring range.

The measurement device 1003c can cause admission of a storage copy in the storage device 1401b, in other words admission of the band filtered and averaged sampling values only for the window region.

While in the storage device 1401a that is connected to useful-echo identification 1002 every fourth averaged IF-value for the entire measuring range is stored, in the storage device 1401b that is connected to echo measuring 1003c every averaged IF-value is stored, but essentially only as long as these values are situated within the window region.

Consequently, a reduction in the stored values can be achieved in that not every value of an entire measuring range is stored, or in that only values of a section and/or window are stored.

Within the framework of signal pre-processing, the signal pre-processing device 1400 carries out bandpass filtering and/or averaging as independent tasks. To this effect said signal pre-processing device 1400 triggers an A/D-conversion of the A/D-converter 140 by way of the trigger connection 1402. The digitised analogue values are read into the storage device with sampled IF-values 1404 by way of the storage connection 1403. The signal pre-processing device 1400 can access the storage device 1404 that comprises the sampled IF-values, and after completion of signal pre-processing, in other words in particular after bandpass filtering and averaging, said signal pre-processing device 1400 can provide the averaged IF-values to the storage device 1405 with the averaged IF-values. For averaging, in each case relative to a distance location, an average value of actually sampled values from the storage device 1404 and of stored values from the storage device 1405 are formed, taking into account certain mutual weighting.

As an alternative to the provision of IF-values it is also imaginable that within signal pre-processing 1400 at the same time envelope forming also takes place, and in the storage devices 1405, 1401a and 1401b averaged envelope values are present instead of averaged IF-values.

By way of the storage connection 1406a, the storage device 1401a for the evaluation device 1000c can read the averaged values for the entire measuring range out of the storage device with averaged values 1405; and by way of the storage connection 1406b, the storage device 1401b that is assigned to the measurement device 1003c can read out the averaged values for the window region only.

Signal pre-processing 1400 can again take place in different sensitivity ranges 1407 and/or in different distance ranges 1407. Signal pre-processing 1400 functions independently of the selected sensitivity range.

FIG. 14 also shows a time diagram 1408 that describes the course of time of three independent tasks that are provided for according to the block diagram shown in FIG. 14. In this arrangement four different cycles of averaging are shown, with four different patterns for differentiation, wherein an averaging cycle time is, for example, 300 ms.

After the first averaging process 1420, averaged values 1409' are provided by the storage device 1405 with averaged values, by way of the storage connection 1406b, to the measurement device 1003c and the associated measurement task 1003c.

Furthermore, averaged values 1410' from the storage device with averaged values 1405 are provided to the evaluation device 1000c by way of the storage connection 1406a. In FIG. 14 the provision of values 1409', 1410' and/or data 1409', 1410' is indicated by curved arrows. After provision of the averaged values to the evaluation device 1000c, based on this data 1409' echo measuring as shown in the second line can take place, followed by useful-echo determination, shown in the third line. In the example shown, both tasks—echo measuring and useful-echo determination—are not completely processed in the first time slice 1409', 1410' but are interrupted in favour of the second averaging process 1421 shown.

Since neither echo measuring 1003c nor useful-echo identification 1000c have been completed, this data that after the second-shown averaging process 1421 is present anew in the storage device 1405 is not retrieved, but instead is only used for renewed averaging 1400. In the second time slice of echo measuring, measuring the data 1409" from the first averaging process 1420, 1409' is then completed. This means that echo measuring 1003c after the third averaging process 1422 retrieves new echo data 1409' for a new echo measuring process from the storage device 1405.

In contrast to this, useful-echo identification 1000c continues to evaluate the data 1410''' retrieved from first averaging 1420 until this evaluation is also complete; and from the last-shown averaging process 1423 new data 1409', 1410' for echo measuring 1003c and useful-echo identification 1000c is provided again.

The cycle time for measuring in the manner shown above is, for example, 600 ms. The example of the time diagram 1408, as explained, shows a divided measurement task 1409, 1003c; in other words, a measured value is available only after two time slices 1409', 1409". In another exemplary embodiment, the measured value could also be present within a single time slice or within more than two time slices. The cycle time can be influenced by several factors. For example, the measuring range or the computing power has a bearing on the number of times the individual tasks are interrupted. In another example, in which each task has a dedicated processor, i.e. a processor of its own, there may essentially be no interruption at all.

In the example of FIG. 14, during the second averaging process 1421 there may not be any transmission of data to the evaluation device 1000c and to the measurement device 1003c, because both of these devices are still busy processing existing data 1409' and 1410'. The cycle time for measuring 1003c is, for example, 600 ms, and the cycle time for evaluation (useful-echo identification) 1000c is, for example, 3 s; in other words, at 3 s the duration for re-positioning the window is considerably longer than the duration for measuring the echoes, which is 600 ms.

Figure 15:
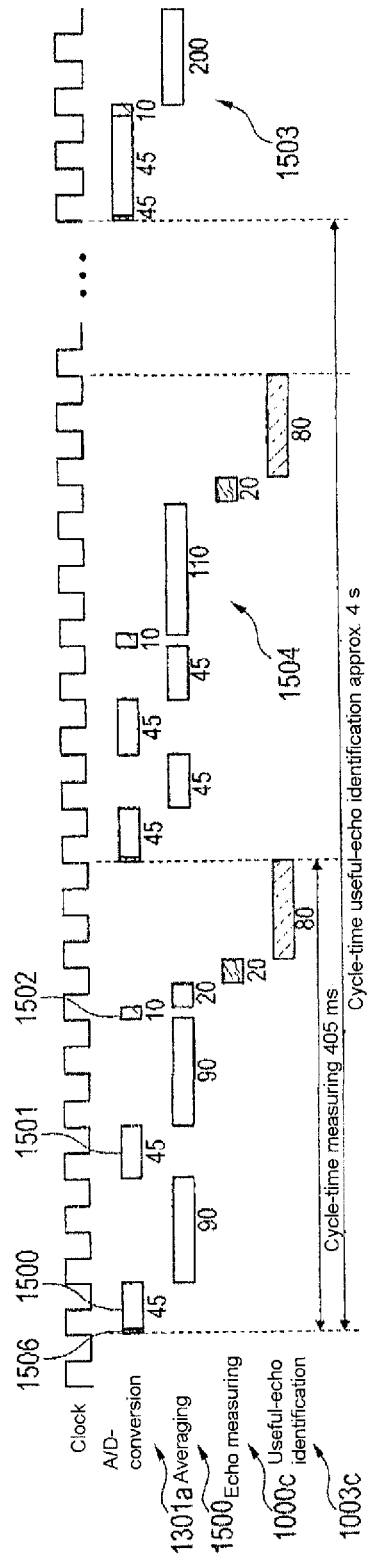
FIG. 15 shows a timing diagram for upstream averaging and processing for a measuring device of FIG. 14, according to an exemplary embodiment of the present invention.

FIG. 15 shows a further timing diagram for variant C, shown in FIG. 14, of the measuring sensor according to an exemplary embodiment of the present invention.

As a result of upstream averaging 1400 there are now four different, independent parallel tasks, namely: the A/D-conversion 1301a, averaging 1500, the measuring task 1000c and the evaluation task 1003c. In this exemplary embodiment the cycle time for evaluation (useful-echo identification) 1003c is approx. 4 seconds. For the measuring range of 80 m, which is assumed in FIG. 15, the processing time for averaging was assumed to be approx. 200 ms. The processing time for measuring is, for example, approx. 20 ms, and the processing time for useful-echo identification 1003c is, for example, approx. 800 ms for an 80 m measuring range of the sensor.

In A/D-conversion 1301a, in a manner similar to that of FIG. 13, first A/D-conversion of the reference pulse 1506 takes place, followed by A/D-conversion of the distance range 0-40 m 1500 in the dynamic range I (duration: 45 ms), followed by A/D-conversion of the distance range 40-80 m 1501 (range I, duration: 45 ms), and finally A/D-conversion of the distance range 0-10 m 1502 in the dynamic range II (duration: 10 ms). As already described, the combination of these distance ranges and sensitivity ranges provides the database for useful-echo identification 1003c. From this database, echo measuring 1500 uses data within the described windows, wherein the sensitivity range is to be selected with reference to the particular echo amplitude.

Following A/D-conversion of a particular range 1500, 1501, 1502, averaging this individual range 1500, 1501, 1502 can immediately take place. For example, intervals of 90 ms, 20 ms, 45 ms, 110 ms and 200 ms can result for averaging.

However, it is also imaginable to first convert all the ranges 1500, 1501, 1502 (A/D-conversion) and then in a block of 200 ms duration to average the entire range 1500, 1501, 1502. This averaging of the entire range 1500, 1501, 1502 is shown in range 1503 of the time diagram of FIG. 15.

The range 1504 shows a further alternative arrangement of the A/D-conversion. In the exemplary embodiment of FIG. 15 the echo measuring task 1000c has been allocated a time slice of 20 ms in which a complete measurement cycle can be carried out. In contrast to this, the useful-echo identification task 1003c requires 10 of the depicted time slices of 80 ms each in order to arrive at a result. This results in a cycle time of echo measuring of 410 ms and a cycle time of useful-echo identification of approx. 4 seconds.

Figure 16:
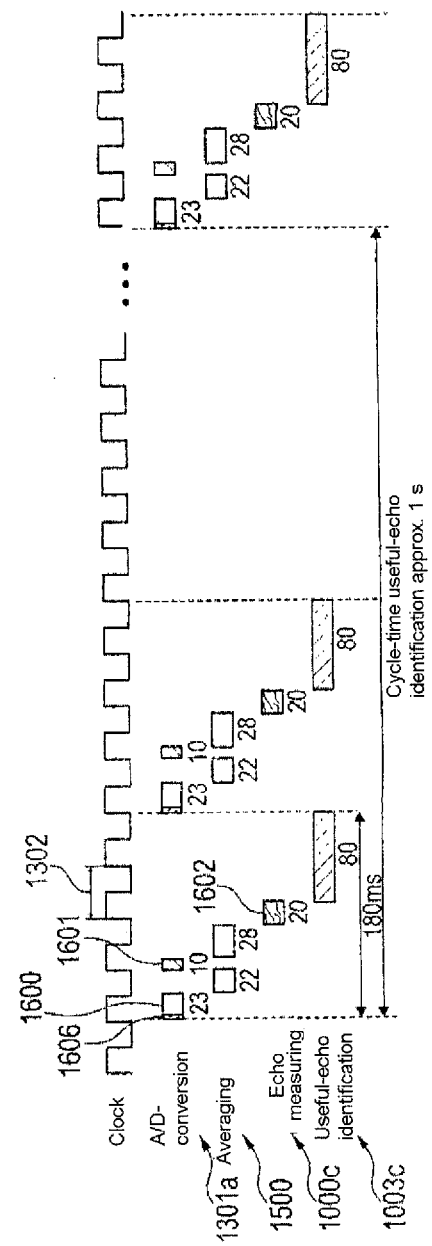
FIG. 16 shows a further timing diagram for upstream averaging and processing for a measuring device of FIG. 14, according to an exemplary embodiment of the present invention.

FIG. 16 shows a further timing diagram for separate upstream averaging and processing for a measuring device of FIG. 14, according to an exemplary embodiment of the present invention.

FIG. 16 shows a further timing diagram for variant C with upstream averaging, but with a measuring range of 20 m. The measuring range is adjusted to the height of the feed material container. It would be a waste of computing time and/or evaluation time to examine within a measuring range of 80 m a container which, for example, measures less than 10 m in height. For this reason measuring sensors can be adjustable, or adjusted, to various measuring ranges. In many applications the container heights may be less than 10 m. Sensors with a measuring range of 80 m are used in very high containers.

In the example of FIG. 16 it is assumed that the processing time for averaging is approx. 50 ms for the 20 m measuring range. The processing time for measuring is approx. 20 ms, as is the case in a measuring range of 80 m, while the processing time for evaluation is approx. 400 ms for the 20 m measuring range. The time slice arrangement of the different tasks of A/D-conversion 1301a, averaging 1500, measuring 1000c, and evaluation 1003c is also shown in FIG. 16.

Within the first cycle of 180 ms the echo profile or the echo curve for the reference pulse 1606, the distance range 0 . . . 20 m 1600 (duration 23 ms) in the dynamic range I and the distance range 0 . . . 10 m 1601 (duration 10 ms) in the dynamic range II are digitised by means of the A/D-converters. The large echoes are thus again expected in the region of 0 m . . . 10 m.

Furthermore, the diagram shows that the averaging device averages at suitable times the values that are provided by the A/D-conversion, e.g. in each case within the remaining time of a trigger period 1302.

After completion of averaging, the values 1602 are available for measuring. In this example the cycle time for echo measuring 1000c is only 180 ms. The cycle time for evaluation (useful-echo identification) 1003c is approx. 1 second.

In variant C of the measuring sensor, sampling (A/D-conversion) is an independent software block and/or an independent hardware device. Furthermore, bandpass filtering and averaging are a dedicated software block (task) or a dedicated device.

For IF-averaging only one averaging device is provided as a shared database for useful-echo identification 1003c and echo measuring 1000c. Consequently the evaluation device 1003c and the measurement device 1000c access a shared database 1405 of averaged values.

As a result of the division into 3 parallel blocks, in variant C only a medium to low measuring rate is achievable for the feed material distance when compared to variants A or B. Likewise, the rate of the echo profile evaluation is low. However, as a result of frequent averaging; very high signal sensitivity in the entire measuring range and in the window can be achieved.

Copying the sampling values to the further storage blocks 1401a and 1401b results in an additional storage device requirement of a quarter of the sampling values that arise in the entire measuring range, for the storage device 1401a and of the additional values, which arise within the window, for the storage device 1401b. The additional values relate to processing of the tasks that is not parallel but serial.

Variant C may make it possible to carry out measurement at high signal sensitivity.

Figure 17:
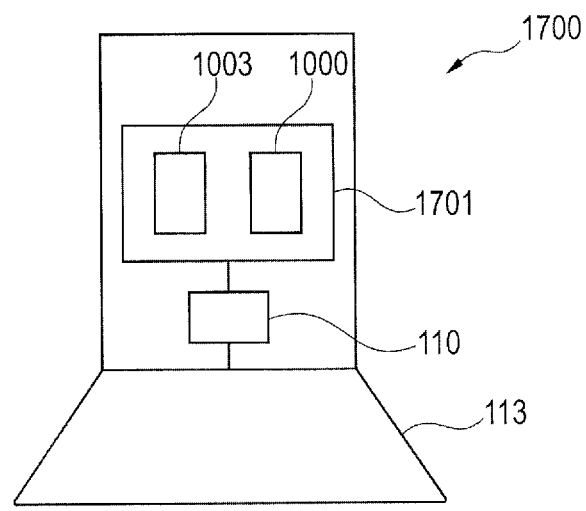
FIG. 17 shows a block diagram of a measuring sensor according to an exemplary embodiment of the present invention.

FIG. 17 shows a block diagram of a measuring sensor according to an exemplary embodiment of the present invention.

The measuring sensor comprises an echo-curve generating device 110; the echo generating device is connected to the antenna 113 and makes it possible to emit a transmission signal in the direction of a feed material surface (not shown in FIG. 17). Furthermore, the measuring device 1700 comprises the analysis device 1701 with the evaluation device 1000 and the measurement device 1003, wherein the analysis device is connected to the echo-curve generating device 110.

The analysis device 1701 receives from the echo generating device an echo curve for further examination by means of the measurement device 1003 and the evaluation device 1000. The measurement device may determine the distance between a useful echo and a reference echo. The evaluation device 1000 or useful-echo identification device may be able to determine the position of an echo. The measuring device 1700 may be switchable for analysing the echo curve, between analysing by means of at least two independent tasks and/or analysing the echo curve by comparing the echo curve with a spurious-echo curve at the IF-level. To this effect the measuring device can offer at least two operating modes. In the first operating mode the echo curve may be analysed by means of at least two independent tasks. In the second operating mode the echo curve may be analysed by comparing the echo curve with a spurious-echo curve at the IF-level. It is possible to switch between the two modes. However, it is also possible for both modes to be active at the same time.

Figure 18:
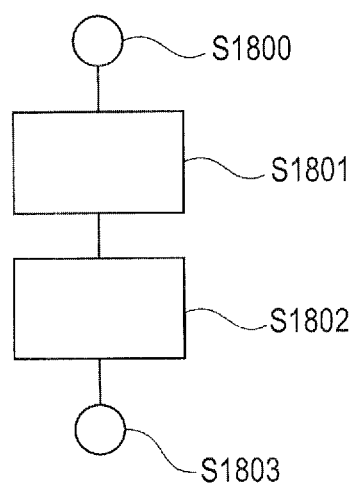
FIG. 18 shows a flow chart for a method for filling level measuring according to an exemplary embodiment of the present invention.

FIG. 18 shows a flow chart for a method for filling level measuring according to an exemplary embodiment of the present invention.

The method starts in an idle state S1800. In a step S1801 an echo curve is generated.

This is followed, in a step S1802, by analysing the echo curve, wherein analysing can be carried out by means of at least two independent tasks, and/or wherein, for analysing, a comparison with a spurious-echo curve at the IF-level can be carried out. In step S1803 the system is back in its idle state.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A computer-implemented echo transit time based method of measuring a filling level of a fill material in a container, comprising the following steps executed by a processor:

generating an echo curve; and
analyzing the echo curve using at least one analysis method selected from the group of analysis methods comprising
(a) analyzing the echo curve using at least two parallel tasks executed in parallel;
wherein at least one of the two parallel tasks includes an evaluation task;
wherein at least one of the two parallel tasks includes a measurement task;
wherein the evaluation task includes determining, from a plurality of received reflections as recorded by the echo curve, an approximate echo position of the fill material surface;
wherein the measurement task includes refining said approximate echo position by determining a distance between the echo position and a reference echo; and
(b) analyzing the echo curve by subtracting from a determined carrier-frequency amplitude-modulated echo profile a carrier-frequency amplitude-modulated spurious profile that does not represent a filling level, the spurious profile being previously determined while no fill material is present in the container.

2. The method according to claim 1, wherein a section of the echo curve is analyzed.

3. The method of claim 2, wherein a first task of the at least two parallel tasks is adapted for selecting a section of an echo curve and wherein a second task of the at least two parallel tasks is adapted for analyzing the selected section of the echo curve.

4. The method according to claim 3, wherein the analyzing step comprises the application of at least one echo analysis method selected from the group of echo analysis methods comprising (a) slope measuring; (b) interpolating; (c) determining the amplitude increase at a beginning of the section; (d) determining a maximum amplitude of the echo; (e) measuring at the slope; comparing with a reference signal; and (f) correlating.

5. The method according to claim 2, further comprising:
forming a window region for selecting said section of the echo curve; and
analyzing the echo curve only within the window region.

6. The method according to claim 5, further comprising:
sliding said window in order to define, for the analyzing step, a new section of the echo curve.

7. The method according to claim 1, wherein the generating step includes at least one method which is selected from the group of methods comprising (a) a transit time method; (b) a pulse transit-time method; (c) a frequency-based method; and (d) an FMCW method.

8. The method according to claim 1, further comprising:
storing at least one of the echo curve and the spurious profile by at least one of (a) sampling the echo curve in pairs at the IF-level and (b) offset sampling the echo curve in pairs at the IF-level.

9. The method according to claim 1, wherein the at least two parallel tasks are in each case started at a point in time of triggering and wherein the points in time of triggering the at least two tasks comprise a pulse sampling ratio other than 50%.

10. The method according to claim 9, wherein the points in time of triggering determine the allocation of the at least two parallel tasks to a shared executing device.

11. The method according to claim 9, wherein the at least two parallel tasks comprise different measuring rates.

12. The method according to claim 1, wherein the parallel execution of the at least two parallel tasks includes interleaving the at least two parallel tasks.

13. The method according to claim 1, wherein the two parallel tasks operate at different repetition rates.

14. The method according to claim 13, wherein the repetition rate of the evaluation task is less than the repetition rate of the measurement task.

15. A non-transitory computer readable storage medium including a set of instructions executable by a processor for echo transit time based measuring a filling level of a fill material in a container, the set of instructions operable to
generating an echo curve; and
analyzing the echo curve using at least one analysis method selected from the group of analysis methods comprising (a) analyzing the echo curve using at least two parallel tasks executed in parallel;
wherein at least one of the two parallel tasks includes an evaluation task;
wherein at least one of the two parallel tasks includes a measurement task;
wherein the evaluation task includes determining, from a plurality of received reflections as recorded by the echo curve, an approximate echo position of the fill material surface;
wherein the measurement task includes refining said approximate echo position by determining a distance between the echo position and a reference echo; and (b) analyzing the echo curve by subtracting from a determined carrier-frequency amplitude-modulated echo profile a carrier-frequency amplitude-modulated spurious profile that does not represent a filling level, the spurious profile being previously determined while no fill material is present in the container.

16. A measuring device for echo transit time based measuring a filling level of a fill material in a container, comprising:
an echo-curve generating device generating an echo curve; and
an analysis device analyzing the echo curve using at least one analysis method selected from the group of analysis methods comprising (a) analyzing the echo curve using at least two parallel tasks executed in parallel;
wherein at least one of the two parallel tasks includes an evaluation task;
wherein at least one of the two parallel tasks includes a measurement task;
wherein the evaluation task includes determining, from a plurality of received reflections as recorded by the echo curve, an approximate echo position of the fill material surface;
wherein the measurement task includes refining said approximate echo position by determining a distance between the echo position and a reference echo; and (b) analyzing the echo curve by subtracting from a determined carrier-frequency amplitude-modulated echo profile a carrier-frequency amplitude-modulated spurious profile that does not represent a filling level, the spurious profile being previously determined while no fill material is present in the container.

17. The measuring device according to claim 16, wherein the measuring device is at least one measuring device selected from the group of measuring devices comprising:
a filling-level measuring device;
a measuring device based on a transit time principle;
a microwave transit-time measuring device;
a measuring device based on a principle of a guided microwave;
a radar measuring device;
an ultrasound transit-time measuring device;
a distance measuring device;
a collision measuring device; and
an echo measuring device.

* * * * *